US008878911B2

(12) United States Patent
Wakazono

(10) Patent No.: US 8,878,911 B2
(45) Date of Patent: Nov. 4, 2014

(54) THREE-DIMENSIONAL IMAGE PICKUP OPTICAL SYSTEM AND THREE-DIMENSIONAL IMAGE PICKUP APPARATUS

(75) Inventor: Tsuyoshi Wakazono, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 499 days.

(21) Appl. No.: 13/327,849

(22) Filed: Dec. 16, 2011

(65) Prior Publication Data

US 2012/0154552 A1 Jun. 21, 2012

(30) Foreign Application Priority Data

Dec. 20, 2010 (JP) .................................. 2010-283492

(51) Int. Cl.
 H04N 13/02 (2006.01)
 G02B 27/28 (2006.01)
 G02B 15/17 (2006.01)
(52) U.S. Cl.
 CPC .............. *G02B 35/02* (2013.01); *G02B 27/283* (2013.01); *G02B 15/17* (2013.01)
 USPC .......................................................... 348/49
(58) Field of Classification Search
 CPC ....... G03B 35/02; G03B 27/283; G03B 15/17
 See application file for complete search history.

(56) References Cited

U.S. PATENT DOCUMENTS

| 6,922,285 B2 * | 7/2005 | Kobayashi ..................... 359/462 |
| 2007/0109665 A1 * | 5/2007 | Wakazono ..................... 359/687 |
| 2009/0046375 A1 * | 2/2009 | Wakazono et al. ........... 359/688 |

FOREIGN PATENT DOCUMENTS

JP 2001166258 A 6/2001

\* cited by examiner

*Primary Examiner* — Sath V Perungavoor
*Assistant Examiner* — Kate Luo
(74) *Attorney, Agent, or Firm* — Rossi, Kimms & McDowell LLP

(57) ABSTRACT

A three-dimensional image pickup optical system for forming two different images having a parallax alternately in time sequence on a single image pickup element, includes, in order from object side: a front system including a pair of negative 1f-lens units, a pair of an optical path deflecting units, and a combining unit for combining two optical paths on the same optical axis; and a rear system including a positive 1b-lens unit which does not move for magnification-varying, a lens unit moving for magnification-varying, and a stop, in which: the front system includes a pair of light quantity control units disposed in optical paths for the eyes on the object side of the combining unit, for switching left and right subject images alternately in a time sharing manner; and power arrangement of the 1f-lens units and the 1b-lens unit is set appropriately.

5 Claims, 12 Drawing Sheets

US 8,878,911 B2

THREE-DIMENSIONAL IMAGE PICKUP OPTICAL SYSTEM AND THREE-DIMENSIONAL IMAGE PICKUP APPARATUS

BACKGROUND OF THE INVENTION

1. Field of the Invention

The present invention relates to a three-dimensional image pickup optical system and a three-dimensional image pickup apparatus using the same, and more particularly, to a high-performance, compact, lightweight three-dimensional image pickup optical system having wide angle of field, high magnification, and bright F-number.

2. Description of the Related Art

Conventionally, there are proposed various three-dimensional image pickup optical apparatus and optical systems for obtaining parallax images. For instance, Japanese Patent Application Laid-Open No. 2001-166258 proposes a three-dimensional image pickup optical system that forms two different images having a parallax for left and right eyes alternately in time sequence on a single image pickup element.

In Japanese Patent Application Laid-Open No. 2001-166258, in order from an object side, a shutter for controlling a light beam, a first lens unit having a negative refractive power, and a reflection mirror as optical path deflecting unit are disposed for each of the left and right eyes. A combination optical element and a stop are disposed at an intersection of optical axes of the left and right eyes or at a position near the intersection, and a magnification-varying lens unit is disposed behind the combination optical element and the stop. Then, the shutters for the left and right eyes are opened and closed alternately in time sequence, to thereby obtain parallax images.

In the embodiment disclosed in Japanese Patent Application Laid-Open No. 2001-166258, a photographing angle of field is wide, that is, 35° to 36° in a half angle of field. However, a magnification-varying ratio is approximately 2, and an F-number at the telephoto end is approximately 4. Therefore, it is difficult to achieve both a high magnification and a bright F-number.

SUMMARY OF THE INVENTION

It is an object of the present invention to provide a high-performance, compact, lightweight three-dimensional image pickup optical system having wide angle of field, high magnification, and bright F-number, for optically combining parallax images obtained from a pair of left and right optical systems so as to form the images on a single image pickup element.

In order to achieve the above-mentioned object, the present invention provides a three-dimensional image pickup optical system for forming two different images having a parallax for left and right eyes alternately in time sequence on a single image pickup element, the three-dimensional image pickup optical system including, in order from an object side: a front optical system including a pair of 1f-lens units each having a negative refractive power, a pair of optical path deflecting unit, and an optical path combining unit for combining two optical paths on the same optical axis; and a rear optical system including a 1b-lens unit having a positive refractive power which does not move for magnification-varying, a lens unit which moves for the magnification-varying, and a stop, in which: the front optical system includes a pair of light quantity control unit, which are disposed in the optical paths for the left and right eyes on the object side of the optical path combining unit, for switching left and right subject images alternately in a time sharing manner; and the following conditions are satisfied:

$$-10.0 < f1f/fw < -1.5 \qquad (1); \text{ and}$$

$$0.9 < f1b/ft < 5.0 \qquad (2),$$

where f1f denotes a focal length of the 1f-lens unit, f1b denotes a focal length of the 1b-lens unit, fw denotes a focal length at a wide angle end of the three-dimensional image pickup optical system, and ft denotes a focal length at a telephoto end of the three-dimensional image pickup optical system.

According to the present invention, it is possible to provide the high-performance, compact, lightweight three-dimensional image pickup optical system having wide angle of field, high magnification, and bright F-number, which forms two different images having a parallax for left and right eyes alternately in time sequence on the single image pickup element.

Further features of the present invention will become apparent from the following description of exemplary embodiments with reference to the attached drawings.

DESCRIPTION OF THE EMBODIMENTS

Hereinafter, exemplary embodiments of the present invention are described in detail with reference to the attached drawings.

Embodiment 1

Figure 1:
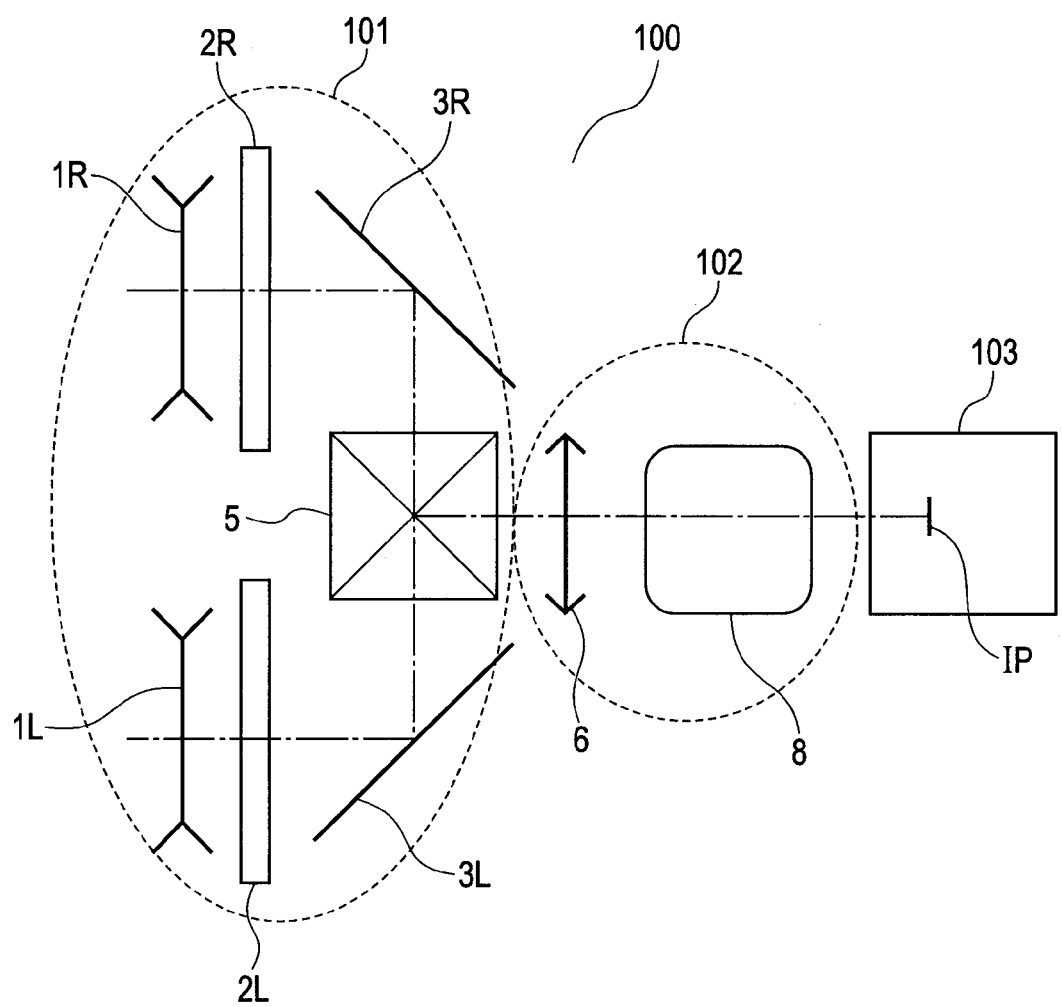
FIG. 1 is a schematic diagram illustrating a structure of a three-dimensional image pickup apparatus according to the present invention.

Hereinafter, a schematic structure of a three-dimensional image pickup apparatus is described with reference to FIG. 1.

A three-dimensional image pickup apparatus of Embodiment 1 of the present invention includes a three-dimensional image pickup optical system 100 having a parallax between left and right eyes and a photographing camera 103. The three-dimensional image pickup optical system 100 includes a front optical system 101 and a rear optical system 102.

The front optical system 101 includes, in order from an object side, a pair of lens units 1R and 1L having a negative refractive power for left and right eyes, light quantity control unit 2R and 2L as means for switching and transmitting left and right images alternately in time sequence, optical path deflecting unit 3R and 3L for deflecting optical paths, and optical path combining unit 5 for deflecting the optical paths of the left and right eyes so as to combine the two optical paths of the left and right eyes on the same optical axis. The light quantity control unit 2R and 2L each are constituted by a liquid crystal shutter, a mechanical shutter, or the like. The optical path deflecting unit 3R and 3L each include a mirror, a prism, or the like. The optical path combining unit 5 includes a polarization beam splitter, a half prism, or the like. Note that, the light quantity control unit 2R and 2L may be disposed between the optical path deflecting unit 3R and 3L and the optical path combining unit 5 or may be disposed on the object side of the lens units 1R and 1L.

The rear optical system 102 includes, in order from the object side, a lens unit 6 having a positive refractive power, and an optical system 8 including a magnification-varying lens unit, a stop, and an imaging lens unit.

The photographing camera 103 includes an imaging portion (imaging plane) IP formed of a single-sensor type imaging system or a plural-sensor type imaging system containing a color separation optical system. An example of the image pickup element constituting the imaging portion IP includes a CCD, a CMOS, and a pickup tube.

In actual photographing, it is necessary to transmit light beams of left and right subject images alternately in a time sharing manner by the light quantity control unit 2R and 2L, to guide each of the light beams independently to the imaging portion IP, and to form the subject images on the image pickup element.

Hereinafter, a specific structure and an operation procedure in the case where the light quantity control unit 2R and 2L are liquid crystal shutters and the optical path combining unit 5 is a polarization beam splitter are described. In this case, it is preferred to perform drive control so that polarization states of the transmitted light beams are orthogonal to each other. Hereinafter, for description, it is supposed that the right transmitted light beam is S-polarized light while the left transmitted light beam is P-polarized light.

Figure 12:
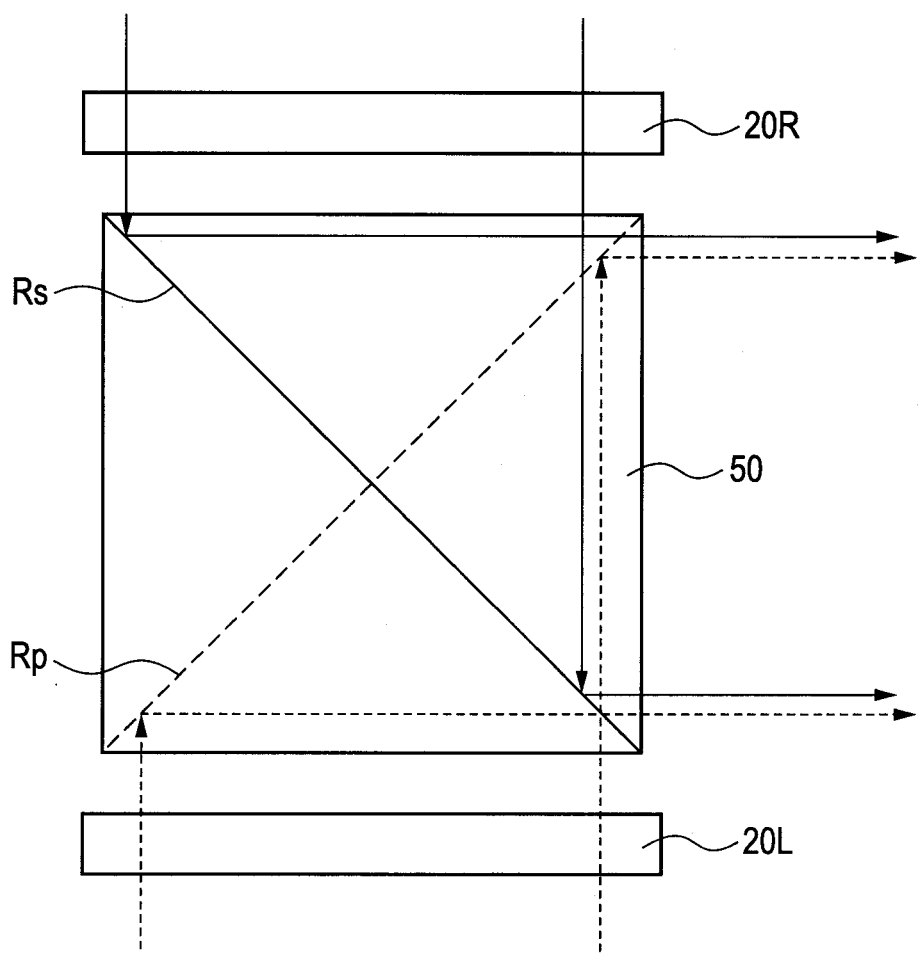
FIG. 12 is a schematic diagram of a liquid crystal shutter and a polarization beam splitter.

FIG. 12 is a schematic diagram illustrating a liquid crystal shutter 20R for transmitting or interrupting the right light beam as the S-polarized light, a liquid crystal shutter 20L for transmitting or interrupting the left light beam as P-polarized light, and a polarization beam splitter prism 50. In the polarization beam splitter prism 50, an interface Rs reflects only the S-polarized light, and an interface Rp reflects only the P-polarized light. In other words, the right light beam (solid line arrow) as the S-polarized light after passing through the liquid crystal shutter 20R is reflected only by the interface Rs, and the left light beam (dotted line arrow) as the P-polarized light after passing through the liquid crystal shutter 20L is reflected only by the interface Rp. In this case, it is preferred to transmit the right light beam while interrupt the left light beam in an even (odd) frame, and to transmit the left light beam while interrupt the right light beam in an odd (even) frame. With the structure described above, the left and right subject images can be guided to the imaging portion IP alternately and independently.

Figure 2:
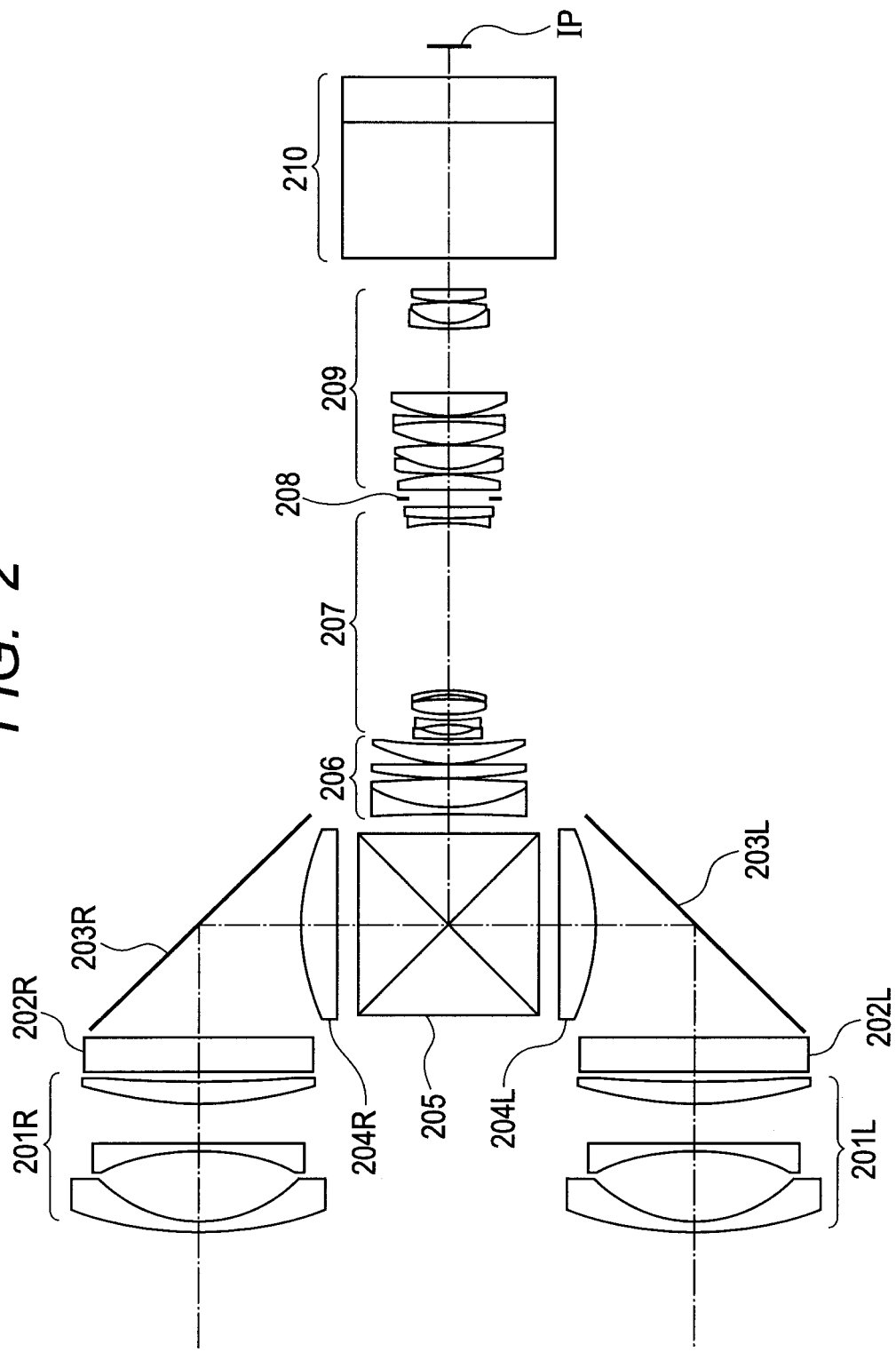
FIG. 2 is a lens cross-sectional view of optical system at a wide angle end and an infinite object distance according to Embodiment 1.

FIG. 2 is an optical cross-sectional view at the wide angle end in focus at infinite object distance according to Embodiment 1 (Numerical Embodiment 1) of the present invention. Hereinafter, referring to FIG. 2, a detailed structure of the three-dimensional image pickup optical system according to Embodiment 1 of the present invention is described.

The three-dimensional image pickup optical system according to Embodiment 1 includes a front optical system and a rear optical system. The front optical system includes, in order from the object side, 1f-lens units 201R and 201L each having a negative refractive index, left and right (two-system) liquid crystal shutters 202R and 202L as means for switching and transmitting left and right subject images alternately in a time sharing manner, mirrors 203R and 203L, 2f-lens units 204R and 204L each having a positive refractive power, and a polarization beam splitter 205. The rear optical system includes, in order from the object side, a 1b-lens unit 206 having a positive refractive power, a magnification-varying lens unit 207, a stop 208, a 4b-lens unit 209 that does not move for magnification-varying, and a color separation optical system 210. In Embodiment 1, the magnification-varying lens unit 207 includes a 2b-lens unit having a negative refractive power for magnification-varying and a 3b-lens unit having a negative refractive power for image point correction. An imaging plane IP is disposed. In the structure of the magnification-varying lens unit 207, the 3b-lens unit may have a positive refractive power. In addition, the magnification-varying lens unit may include three or more lens units. The stop 208 may be disposed inside the magnification-varying lens unit 207, and further the stop 208 may be movable. Note that, focusing is performed by the 1b-lens unit 206 in Embodiment 1, but it is also possible to perform the focusing by an inner lens unit included in the magnification-varying lens unit 207 or the 4b-lens unit 209.

In general, achieving wide angle, high magnification, and large diameter accompanies the size increase of the front optical system. By appropriately setting power arrangement of the 1f-lens units 201R and 201L disposed closest to the object side and the 1b-lens unit 206 disposed closest to the object side in the rear optical system, it is possible to achieve a high-performance, compact, lightweight three-dimensional image pickup optical system having wide angle, high magnification, and bright F-number.

Conditional Expression (1) defines a range of a focal length of the 1f-lens unit normalized by a wide angle end focal length:

$$-10.0 < f1f/fw < -1.5 \tag{1}$$

where f1f denotes the focal length of the 1f-lens unit, and fw denotes the wide angle end focal length.

If the upper limit condition of Conditional Expression (1) is not satisfied, an axial ray effective diameter of the polarization beam splitter at the telephoto side is increased along with an increase in power of the 1f-lens unit. Thus, the size of the front optical system increases, and it becomes difficult to achieve the reduction in size and weight. If the lower limit condition of Conditional Expression (1) is not satisfied, off-axial ray effective diameters of the 1f-lens unit, the shutter, and the mirror at the wide angle side are increased along with a decrease in power of the 1f-lens unit. Thus, the size of the front optical system increases, and it becomes difficult to achieve the reduction in size and weight. Here, it is more preferred to satisfy the following expression.

$$-7.0 < f1f/fw < -2.5 \tag{1a}$$

Conditional Expression (2) defines a range of a focal length of the 1b-lens unit normalized by a telephoto end focal length:

$$0.9 < f1b/ft < 5.0 \tag{2}$$

where f1b denotes the focal length of the 1b-lens unit, and ft denotes the telephoto end focal length.

If the upper limit condition of Conditional Expression (2) is not satisfied, an off-axial ray effective diameter of the front optical system at the wide angle side is increased along with a decrease in power of the 1b-lens unit. As a result, the sizes of the 1f-lens unit, the shutter, and the mirror increase, and it becomes difficult to achieve the reduction in size and weight. If the lower limit condition of Conditional Expression (2) is not satisfied, an axial ray effective diameter of the 1b-lens unit is increased along with an increase in power of the 1f-lens unit. As a result, it becomes difficult to achieve a bright F-number at the telephoto side.

Here, it is more preferred to satisfy the following expression.

$$1.2 < f1b/ft < 3.5 \tag{2a}$$

In addition, in the front optical system, it is preferred to dispose a 2f-lens unit having a positive refractive power between the mirror and the polarization beam splitter. By disposing the 2f-lens unit, the off-axial ray effective diameters of the 1f-lens unit, the shutter, and the mirror can be reduced more.

In addition, it is preferred that the optical system include, in order from the object side, the 1b-lens unit having a positive refractive power that does not move for magnification-varying, the 2b-lens unit having a negative refractive power that moves in the magnification-varying, the 3b-lens unit for image plane correction, the stop, and the 4b-lens unit having a positive refractive power that does not move for the magnification-varying. With this structure, it is possible to realize a compact, lightweight zoom lens having high magnification. In addition, it is preferred to dispose the stop closer to the image side with respect to the magnification-varying lens unit, because there is no variation of the F-number due to the magnification-varying.

In addition, it is preferred to satisfy the following condition in the rear optical system:

$$0.15 < \beta vw \times \beta cw \times \beta rw < 0.60 \tag{3}$$

where $\beta vw$ denotes an imaging magnification of the 2b-lens unit at the wide angle end and an infinite object distance, $\beta cw$ denotes an imaging magnification of the 3b-lens unit at the wide angle end and the infinite object distance, and $\beta rw$ denotes an imaging magnification of the 4b-lens unit at the wide angle end and the infinite object distance. If the upper limit condition of Conditional Expression (3) is not satisfied, an increasing ratio of aberration generated in an optical system closer to the object side with respect to the magnification-varying lens unit, and it becomes difficult to realize high performance. If the lower limit condition of Conditional Expression (3) is not satisfied, the off-axial ray effective diameters of the 1f-lens unit, the shutter, and the mirror are increased. As a result, the size of the front optical system increases, and it is difficult to realize the reduction in size and weight.

Here, it is more preferred to satisfy the following expression.

$$0.25 < \beta vw \times \beta cw \times \beta rw < 0.45 \tag{3a}$$

By satisfying the above-mentioned Conditional Expression, Embodiment 1 realizes the high-performance, compact, lightweight three-dimensional image pickup optical system having wide angle, high magnification, and bright F-number.

Figure 3A:
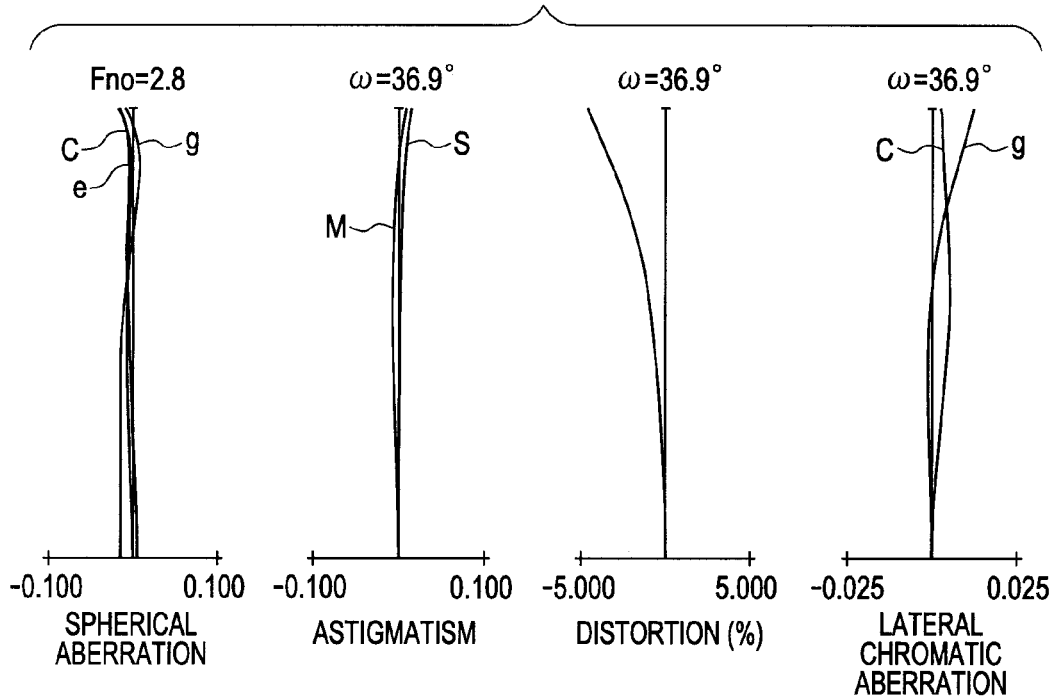
FIG. 3A is an aberration diagram at the wide angle end and an object distance of 3.0 m according to Embodiment 1.
Figure 3B:
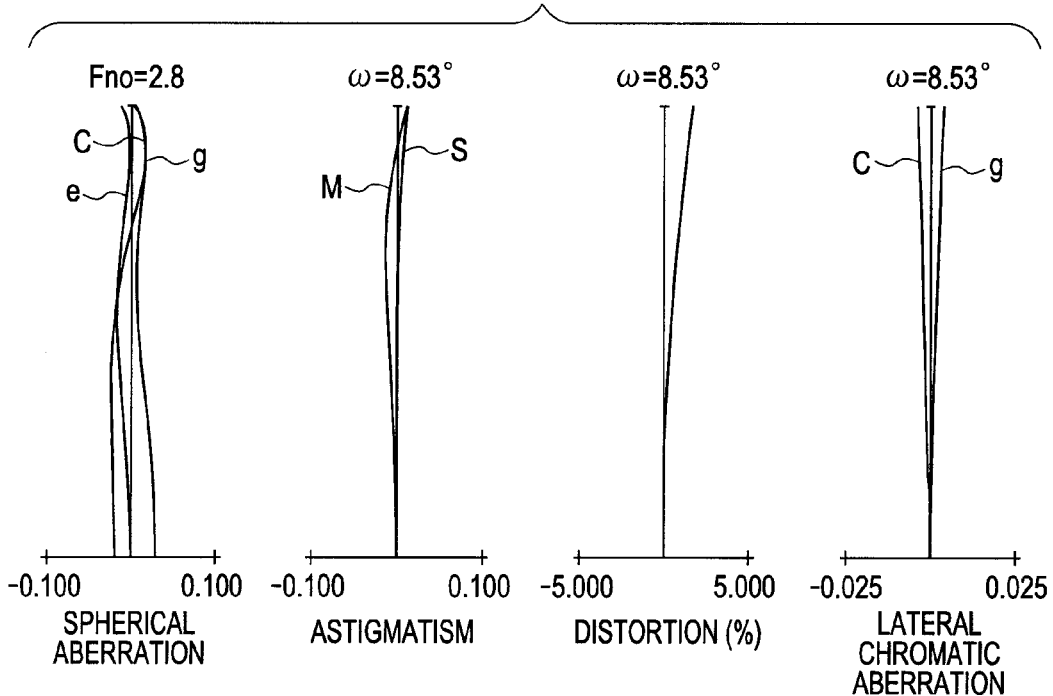
FIG. 3B is an aberration diagram at a telephoto end and an object distance of 3.0 m according to Embodiment 1.

FIG. 3A is a longitudinal aberration diagram at the wide angle end in focus at an object distance of 3.0 m according to Numerical Embodiment 1 corresponding to Embodiment 1. FIG. 3B is a longitudinal aberration diagram at the telephoto end in focus at an object distance of 3.0 m according to Numerical Embodiment 1. The scales are 0.1 mm for spherical aberration, 0.1 mm for astigmatism, 5% for distortion, and 0.025 mm for lateral chromatic aberration. In addition, in the axial chromatic aberration diagrams and the lateral chromatic aberration diagrams of FIGS. 3A and 3B, aberrations at wavelengths of 546 nm, 436 nm, and 656 nm are represented by e, g, and C. Sagittal is represented by S, and meridional is represented by M. In addition, an F-number is represented by Fno, and a half angle of field) (°) is represented by ω in the diagrams.

Note that, in the numerical embodiments, a curvature radius is represented by r, a lens thickness or a lens interval is represented by d, a refractive index at a wavelength of 546 nm is represented by nd, an Abbe number is represented by vd, and an aspheric surface is represented by "*". The aspheric surface is defined by the following expression.

$$x = \frac{cy^2}{1 + \sqrt{1 - (1+K)c^2 y^2}} + A_4 y^4 + A_6 y^6 + A_8 y^8 + \ldots$$

where c denotes a curvature (1/r), y denotes a height from the optical axis, K denotes a conic constant, and $A_4, A_6, A_8 \ldots$ denote aspheric coefficients of individual orders.

In Numerical Embodiment 1 corresponding to Embodiment 1, values of focal lengths and curvature radii of the individual units satisfy Conditional Expressions (1) to (3). In addition, Conditional Expressions (1a), (2a), and (3a) of more preferred value ranges are also satisfied. Thus, a half angle of field of 36.9° at the wide angle end, a magnification-varying ratio of 5, and an F-number of 2.8 at the telephoto end are achieved.

(Numerical Embodiment 1)

Surface data

| Surface number | r | d | nd | vd | Effective diameter |
|---|---|---|---|---|---|
| 1* | 80.506 | 1.50 | 1.88300 | 40.8 | 36.14 |
| 2 | 21.150 | 10.85 | | | 30.21 |
| 3 | −34.304 | 1.20 | 1.81600 | 46.6 | 29.59 |
| 4 | 37447.662 | 6.06 | | | 30.31 |
| 5 | 57.379 | 3.36 | 1.84666 | 23.8 | 32.79 |
| 6 | 404.429 | 1.50 | | | 32.63 |
| 7 | ∞ | 5.00 | 1.51633 | 64.1 | 32.45 |
| 8 | ∞ | 33.00 | | | 31.93 |
| 9 | 38.183 | 5.20 | 1.60311 | 60.6 | 26.79 |
| 10* | 2632.058 | 3.00 | | | 25.74 |
| 11 | ∞ | 28.00 | 1.51633 | 64.1 | 24.45 |
| 12 | ∞ | 3.00 | | | 21.70 |

(Numerical Embodiment 1)

| | | | | | |
|---|---|---|---|---|---|
| 13 | −403.791 | 1.00 | 1.72047 | 34.7 | 21.40 |
| 14 | 23.364 | 4.52 | 1.49700 | 81.5 | 21.25 |
| 15 | −93.077 | 0.15 | | | 21.40 |
| 16 | 64.993 | 2.13 | 1.59240 | 68.3 | 21.48 |
| 17 | −1669.583 | 0.15 | | | 21.37 |
| 18 | 24.245 | 2.67 | 1.60311 | 60.6 | 20.97 |
| 19 | 60.818 | (Variable) | | | 20.45 |
| 20 | 38.987 | 0.70 | 1.88300 | 40.8 | 9.01 |
| 21 | 10.361 | 1.65 | | | 8.50 |
| 22 | −21.257 | 0.70 | 1.81600 | 46.6 | 8.52 |
| 23 | 34.729 | 0.79 | | | 8.83 |
| 24 | 22.961 | 2.32 | 1.78472 | 25.7 | 9.48 |
| 25 | −30.385 | 0.52 | | | 9.69 |
| 26 | −14.616 | 0.70 | 1.64000 | 60.1 | 9.69 |
| 27 | −27.590 | (Variable) | | | 9.99 |
| 28 | −22.647 | 0.70 | 1.72916 | 54.7 | 10.94 |
| 29 | 50.839 | 1.69 | 1.80809 | 22.8 | 11.51 |
| 30 | −483.342 | (Variable) | | | 11.92 |
| 31 (Stop) | ∞ | 1.40 | | | 12.54 |
| 32 | 247.707 | 2.41 | 1.58913 | 61.1 | 13.37 |
| 33 | −29.176 | 0.15 | | | 13.84 |
| 34 | 74.274 | 0.70 | 1.83481 | 42.7 | 14.13 |
| 35 | 15.125 | 3.77 | 1.50137 | 56.4 | 14.19 |
| 36 | −70.116 | 0.15 | | | 14.66 |
| 37 | 21.633 | 3.61 | 1.50137 | 56.4 | 15.29 |
| 38 | −41.222 | 0.70 | 1.83481 | 42.7 | 15.22 |
| 39 | 142.245 | 0.15 | | | 15.28 |
| 40 | 18.007 | 3.65 | 1.58913 | 61.1 | 15.54 |
| 41 | 7411.952 | 10.00 | | | 15.05 |
| 42 | 60.321 | 0.70 | 1.88300 | 40.8 | 10.82 |
| 43 | 9.331 | 3.26 | 1.49700 | 81.5 | 10.22 |
| 44 | −53.604 | 0.29 | | | 10.14 |
| 45 | 28.628 | 1.73 | 1.50137 | 56.4 | 9.97 |
| 46 | −799.808 | 5.00 | | | 9.67 |
| 47 | ∞ | 21.00 | 1.70154 | 41.2 | 30.00 |
| 48 | ∞ | 6.75 | 1.51633 | 64.1 | 30.00 |
| 49 | ∞ | | | | 30.00 |
| Image plane | ∞ | | | | |

Aspherical surface data

First surface

K = 1.07042e+001  A 4 = 5.17206e−006  A 6 = −7.92727e−009
A 8 = −1.41710e−012  A10 = −7.07556e−015  A12 = 5.64853e−018

Tenth surface

K = 3.24310e+0 04  A 4 = 2.28446e−006  A 6 = −1.00527e−009
A 8 = 8.75699e−013  A10 = −1.56762e−014  A12 = −6.00437e−017

Various data
Zoom ratio 5.00

| Focal length | 4.00 | 8.00 | 12.00 | 16.00 | 20.00 |
|---|---|---|---|---|---|
| F-number | 2.80 | 2.80 | 2.80 | 2.80 | 2.80 |
| Angle of field | 36.87 | 20.56 | 14.04 | 10.62 | 8.53 |
| Image height | 3.00 | 3.00 | 3.00 | 3.00 | 3.00 |
| Total lens length | 220.98 | 220.98 | 220.98 | 220.98 | 220.98 |
| BF | 4.99 | 4.99 | 4.99 | 4.99 | 4.99 |
| d19 | 0.93 | 12.88 | 17.97 | 20.92 | 22.85 |
| d27 | 26.28 | 12.55 | 7.42 | 5.27 | 4.56 |
| d30 | 1.30 | 3.08 | 3.11 | 2.32 | 1.10 |
| d49 | 4.99 | 4.99 | 4.99 | 4.99 | 4.99 |
| Entrance pupil position | 24.09 | 27.71 | 30.56 | 32.95 | 34.97 |
| Exit pupil position | −56.72 | −56.72 | −56.72 | −56.72 | −56.72 |
| Front principal point position | 27.83 | 34.67 | 40.23 | 44.80 | 48.49 |
| Rear principal point position | 0.99 | −3.01 | −7.01 | −11.01 | −15.01 |

Zoom lens unit data

| Unit | First surface | Focal length | Lens structure length | Front principal point position | Rear principal point position |
|---|---|---|---|---|---|
| 1 | 1 | 14.30 | 112.29 | 31.71 | 26.64 |
| 2 | 20 | −12.40 | 7.38 | 0.31 | −5.32 |
| 3 | 28 | −34.60 | 2.39 | −0.10 | −1.44 |
| 4 | 31 | 18.81 | 65.42 | 8.26 | −41.99 |

Embodiment 2

Embodiment 2 of the present invention is described.

Figure 4:
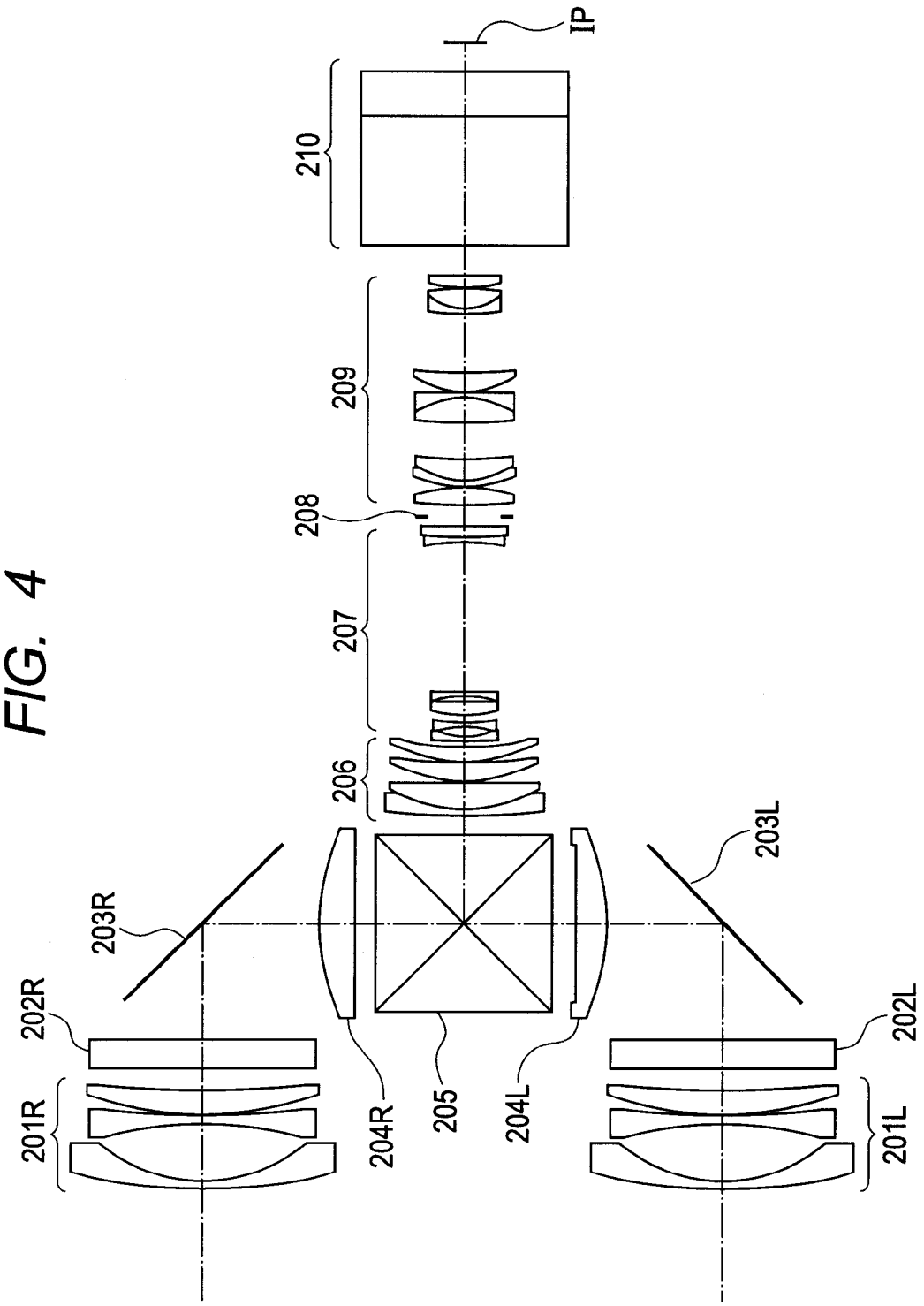
FIG. 4 is a lens cross-sectional view of optical system at a wide angle end and an infinite object distance according to Embodiment 2.

FIG. 4 is an optical cross-sectional view at a wide angle end in focus at an infinite object distance in a three-dimensional image pickup apparatus according to Embodiment 2 (Numerical Embodiment 2) of the present invention. A three-dimensional image pickup optical system of Embodiment 2 has basically the same structure as Embodiment 1, and hence description of each structure is omitted.

Figure 5A:
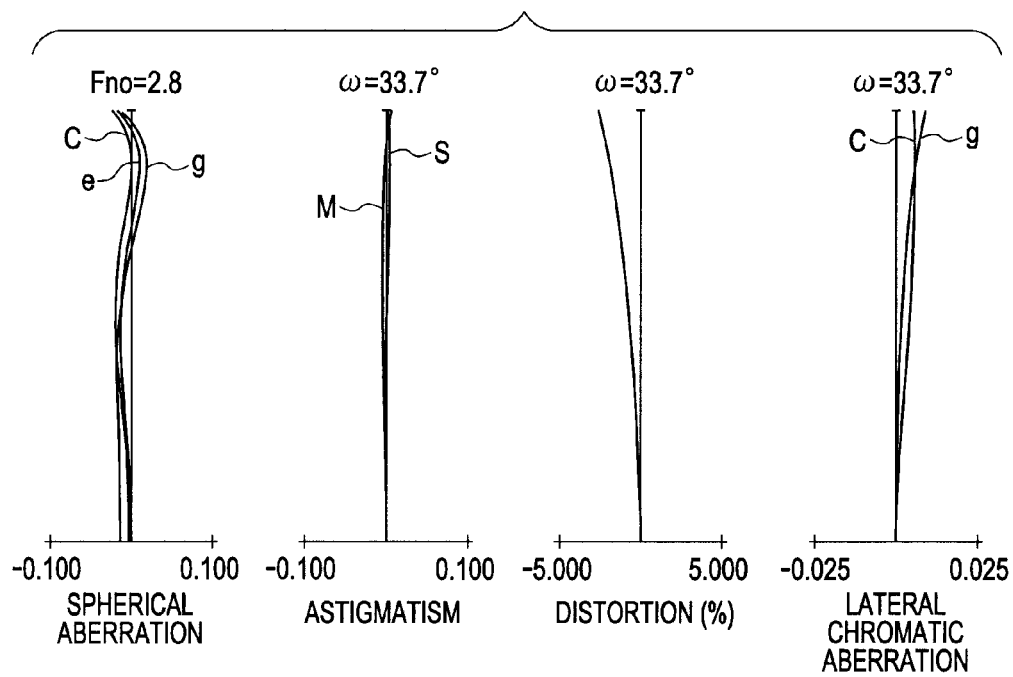
FIG. 5A is an aberration diagram at the wide angle end and an object distance of 3.0 m according to Embodiment 2.
Figure 5B:
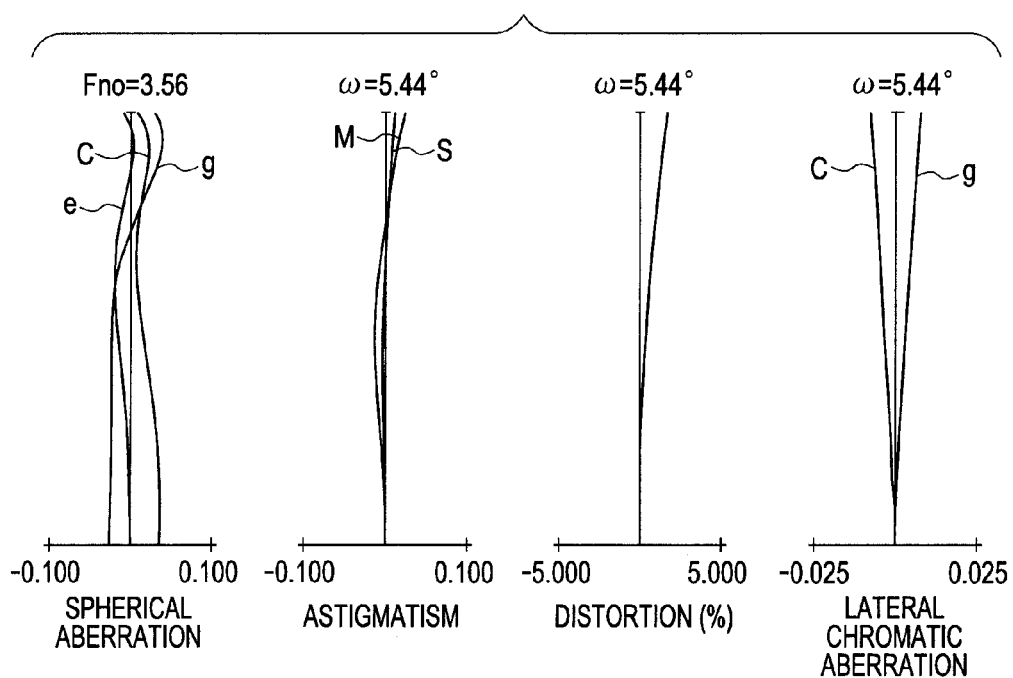
FIG. 5B is an aberration diagram at a telephoto end and an object distance of 3.0 m according to Embodiment 2.

FIG. 5A is a longitudinal aberration diagram at the wide angle end in focus at an object distance of 3.0 m according to Numerical Embodiment 2 corresponding to Embodiment 2. FIG. 5B is a longitudinal aberration diagram at a telephoto end in focus at an object distance of 3.0 m according to Numerical Embodiment 2. The scales are 0.1 mm for spherical aberration, 0.1 mm for astigmatism, 5% for distortion, and 0.025 mm for lateral chromatic aberration.

Numerical Embodiment 2 corresponding to Embodiment 2 satisfies Conditional Expressions (1) to (3). In addition, Conditional Expressions (1a), (2a), and (3a) of more preferred value ranges are also satisfied. Thus, a half angle of field of 33.7° at the wide angle end, a magnification-varying ratio of 7, and an F-number of 3.56 at the telephoto end are achieved.

(Numerical Embodiment 2)

Surface data

| Surface number | r | d | nd | vd | Effective diameter |
|---|---|---|---|---|---|
| 1* | 100.018 | 1.50 | 1.88300 | 40.8 | 38.80 |
| 2 | 26.650 | 8.97 | | | 33.75 |
| 3 | −59.407 | 1.30 | 1.83481 | 42.7 | 33.50 |
| 4 | 113.421 | 0.15 | | | 33.64 |
| 5 | 56.295 | 4.06 | 1.80809 | 22.8 | 34.12 |
| 6 | 288.706 | 3.00 | | | 33.89 |
| 7 | ∞ | 5.00 | 1.51633 | 64.1 | 33.58 |
| 8 | ∞ | 36.00 | | | 33.18 |
| 9 | 37.702 | 5.77 | 1.60311 | 60.6 | 28.78 |
| 10* | −12555.617 | 3.00 | | | 27.68 |
| 11 | ∞ | 29.00 | 1.51633 | 64.1 | 25.99 |
| 12 | ∞ | 3.00 | | | 23.23 |
| 13 | 100.852 | 1.00 | 1.72047 | 34.7 | 22.82 |
| 14 | 22.997 | 4.79 | 1.43875 | 94.9 | 22.30 |
| 15 | −102.478 | 0.15 | | | 22.33 |
| 16 | 31.778 | 2.75 | 1.49700 | 81.5 | 22.16 |
| 17 | 140.216 | 0.15 | | | 21.83 |
| 18 | 27.432 | 2.12 | 1.60311 | 60.6 | 21.18 |
| 19 | 47.136 | (Variable) | | | 20.58 |
| 20 | 26.407 | 0.70 | 1.88300 | 40.8 | 8.86 |
| 21 | 8.567 | 1.61 | | | 8.22 |
| 22 | −25.806 | 0.70 | 1.81600 | 46.6 | 8.23 |
| 23 | 42.536 | 1.11 | | | 8.46 |
| 24 | 17.239 | 2.35 | 1.80809 | 22.8 | 9.24 |
| 25 | −51.820 | 0.66 | | | 9.26 |

(Numerical Embodiment 2)

| | | | | |
|---|---|---|---|---|
| 26 | −16.696 | 0.70 | 1.77250 49.6 | 9.23 |
| 27 | −213.834 | (Variable) | | 9.47 |
| 28 | −20.535 | 0.70 | 1.72916 54.7 | 10.79 |
| 29 | 65.992 | 1.63 | 1.80809 22.8 | 11.43 |
| 30 | −161.001 | (Variable) | | 11.88 |
| 31 (Stop) | ∞ | 1.70 | | 12.85 |
| 32 | 49.265 | 3.22 | 1.58913 61.1 | 14.17 |
| 33 | −23.028 | 0.15 | | 14.55 |
| 34 | 22.746 | 0.70 | 1.83481 42.7 | 14.57 |
| 35 | 12.401 | 3.79 | 1.50137 56.4 | 14.06 |
| 36 | 68.072 | 5.64 | | 13.92 |
| 37 | 56.101 | 4.18 | 1.50137 56.4 | 13.87 |
| 38 | −14.585 | 0.70 | 1.83481 42.7 | 13.69 |
| 39 | −169.718 | 0.15 | | 13.97 |
| 40 | 15.175 | 2.94 | 1.58913 61.1 | 14.29 |
| 41 | 52.689 | 10.00 | | 13.81 |
| 42 | 39.477 | 0.70 | 1.88300 40.8 | 10.72 |
| 43 | 9.519 | 3.16 | 1.49700 81.5 | 10.19 |
| 44 | −68.987 | 0.50 | | 10.11 |
| 45 | 43.033 | 1.79 | 1.50137 56.4 | 9.96 |
| 46 | −57.075 | 5.00 | | 9.73 |
| 47 | ∞ | 21.00 | 1.70154 41.2 | 30.00 |
| 48 | ∞ | 6.75 | 1.51633 64.1 | 30.00 |
| 49 | ∞ | | | 30.00 |
| Image plane | ∞ | | | |

Aspherical surface data

First surface

K = −2.53962e+001   A 4 = 6.58841e−006   A 6 = −4.56899e−009
A 8 = 8.55051e−013   A10 = 7.52786e−015   A12 = −9.57386e−018

Tenth surface

K = −1.67266e+006   A 4 = 2.31183e−006   A 6 = 3.97576e−010
A 8 = −1.82432e−012   A10 = 1.33069e−014   A12 = −4.60575e−017

Various data
Zoom ratio 7.00

| | | | | | |
|---|---|---|---|---|---|
| Focal length | 4.50 | 9.00 | 13.50 | 24.75 | 31.50 |
| F-number | 2.80 | 2.80 | 2.80 | 2.80 | 3.56 |
| Angle of field | 33.69 | 18.43 | 12.53 | 6.91 | 5.44 |
| Image height | 3.00 | 3.00 | 3.00 | 3.00 | 3.00 |
| Total lens length | 225.22 | 225.22 | 225.22 | 225.22 | 225.22 |
| BF | 4.96 | 4.96 | 4.96 | 4.96 | 4.96 |
| d19 | 0.98 | 11.55 | 16.05 | 21.09 | 22.58 |
| d27 | 23.85 | 10.81 | 5.67 | 2.27 | 2.64 |
| d30 | 1.50 | 3.97 | 4.61 | 2.96 | 1.10 |
| d49 | 4.96 | 4.96 | 4.96 | 4.96 | 4.96 |
| Entrance pupil position | 28.90 | 33.86 | 37.81 | 45.50 | 49.13 |
| Exit pupil position | −87.49 | −87.49 | −87.49 | −87.49 | −87.49 |
| Front principal point position | 33.18 | 41.99 | 49.34 | 63.62 | 69.90 |
| Rear principal point position | 0.46 | −4.04 | −8.54 | −19.79 | −26.54 |

Zoom lens unit data

| Unit | First surface | Focal length | Lens structure length | Front principal point position | Rear principal point position |
|---|---|---|---|---|---|
| 1 | 1 | 15.80 | 111.71 | 35.60 | 21.27 |
| 2 | 20 | −9.70 | 7.83 | 1.29 | −4.20 |
| 3 | 28 | −34.40 | 2.33 | −0.24 | −1.55 |
| 4 | 31 | 21.82 | 72.07 | 13.48 | −52.23 |

Embodiment 3

Embodiment 3 of the present invention is described.

Figure 6:
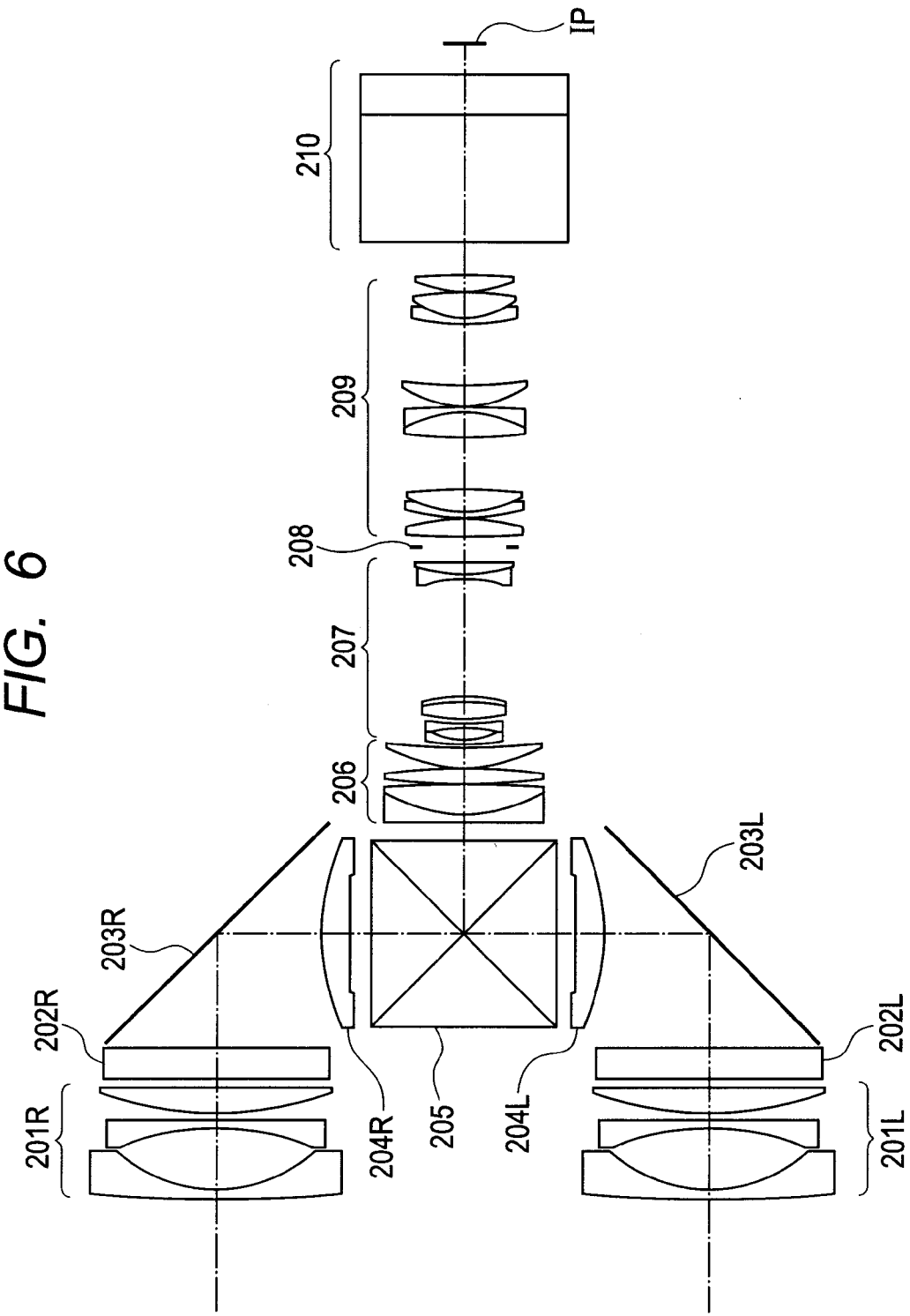
FIG. 6 is a lens cross-sectional view of optical system at a wide angle end and an infinite object distance according to Embodiment 3.
Figure 7A:
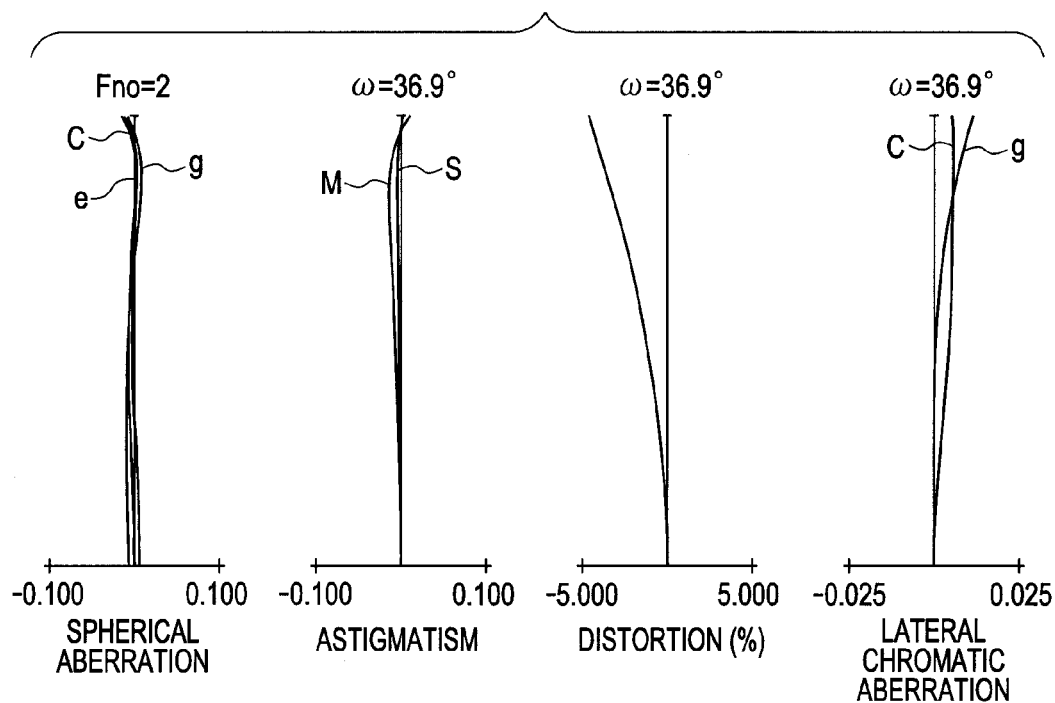
FIG. 7A is an aberration diagram at the wide angle end and an object distance of 3.0 m according to Embodiment 3.
Figure 7B:
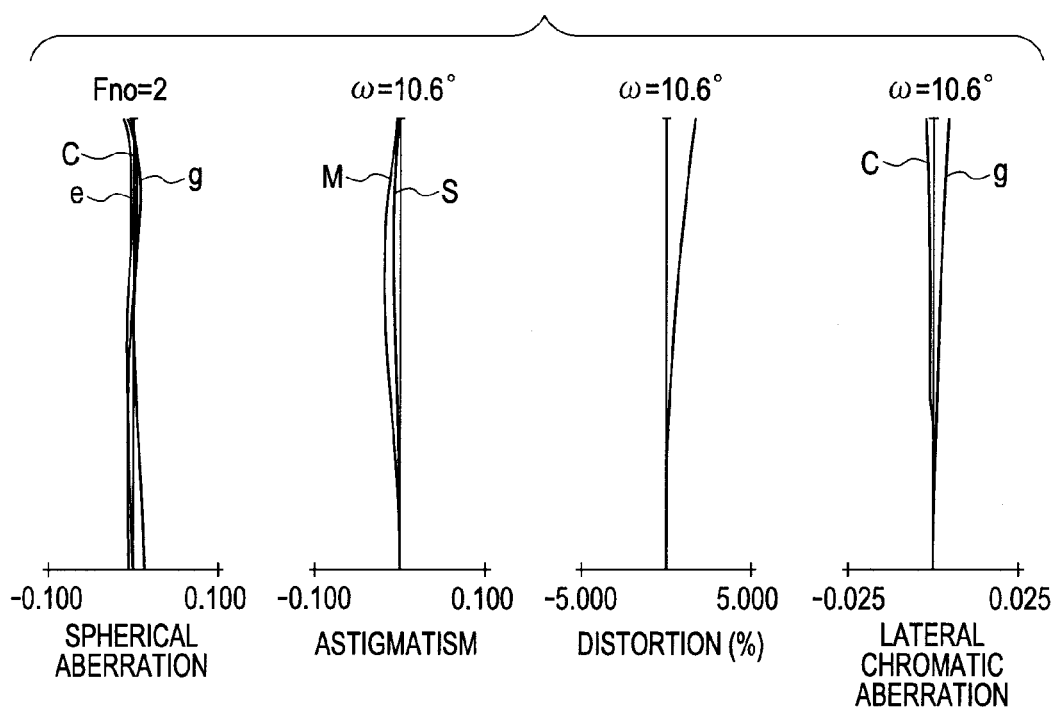
FIG. 7B is an aberration diagram at a telephoto end and an object distance of 3.0 m according to Embodiment 3.

FIG. 6 is an optical cross-sectional view at a wide angle end in focus at an infinite object distance in a three-dimensional image pickup apparatus according to Embodiment 3 (Numerical Embodiment 3) of the present invention. A three-dimensional image pickup optical system of Embodiment 3 has basically the same structure as Embodiments 1 and 2, and hence description thereof is omitted. FIG. 7A is a longitudinal aberration diagram at the wide angle end in focus at an object distance of 3.0 m according to Numerical Embodiment 3. FIG. 7B is a longitudinal aberration diagram at a telephoto end in focus at an object distance of 3.0 m according to Numerical Embodiment 3. The scales are 0.1 mm for spherical aberration, 0.1 mm for astigmatism, 5% for distortion, and 0.025 mm for lateral chromatic aberration.

Numerical Embodiment 3 corresponding to Embodiment 3 satisfies Conditional Expressions (1) to (3). In addition, Conditional Expressions (1a), (2a), and (3a) of more preferred value ranges are also satisfied. Thus, a half angle of field of 36.9° at the wide angle end, a magnification-varying ratio of 4, and an F-number of 2.0 at the telephoto end are achieved.

(Numerical Embodiment 3)

Surface data

| Surface number | r | d | nd | vd | Effective diameter |
|---|---|---|---|---|---|
| 1* | −3184.612 | 1.50 | 1.88300 | 40.8 | 37.77 |
| 2 | 23.636 | 9.77 | | | 31.70 |
| 3 | −43.222 | 1.20 | 1.81600 | 46.6 | 31.56 |
| 4 | 5869.106 | 1.28 | | | 32.58 |
| 5 | 52.203 | 3.89 | 1.84666 | 23.8 | 34.47 |
| 6 | 1289.119 | 1.50 | | | 34.37 |
| 7 | ∞ | 5.00 | 1.51633 | 64.1 | 34.16 |
| 8 | ∞ | 35.00 | | | 33.66 |
| 9 | 33.605 | 4.30 | 1.60311 | 60.6 | 28.54 |
| 10* | 326.994 | 3.00 | | | 27.87 |
| 11 | ∞ | 30.00 | 1.51633 | 64.1 | 26.35 |
| 12 | ∞ | 3.00 | | | 23.37 |
| 13 | −644.302 | 1.00 | 1.72047 | 34.7 | 23.02 |
| 14 | 22.413 | 4.90 | 1.49700 | 81.5 | 22.79 |
| 15 | −142.104 | 0.15 | | | 22.94 |
| 16 | 101.949 | 2.39 | 1.59240 | 68.3 | 23.06 |
| 17 | −120.071 | 0.15 | | | 23.03 |
| 18 | 23.761 | 3.06 | 1.60311 | 60.6 | 22.48 |
| 19 | 68.646 | (Variable) | | | 21.94 |
| 20 | 69.579 | 0.70 | 1.88300 | 40.8 | 10.77 |
| 21 | 11.334 | 1.93 | | | 10.13 |
| 22 | −20.021 | 0.70 | 1.81600 | 46.6 | 10.15 |
| 23 | 73.491 | 0.81 | | | 10.64 |
| 24 | 28.424 | 2.49 | 1.78472 | 25.7 | 11.54 |
| 25 | −29.724 | 0.56 | | | 11.79 |
| 26 | −16.625 | 0.70 | 1.64000 | 60.1 | 11.79 |
| 27 | −26.261 | (Variable) | | | 12.12 |
| 28 | −18.427 | 0.70 | 1.72916 | 54.7 | 12.36 |
| 29 | 26.816 | 1.63 | 1.80518 | 25.4 | 13.45 |
| 30 | 1131.942 | (Variable) | | | 13.74 |
| 31 (Stop) | ∞ | 1.70 | | | 14.54 |
| 32 | 126.595 | 3.11 | 1.58913 | 61.1 | 15.93 |
| 33 | −26.015 | 0.15 | | | 16.50 |
| 34 | 40.799 | 0.70 | 1.83481 | 42.7 | 17.00 |
| 35 | 20.547 | 3.87 | 1.50137 | 56.4 | 16.87 |
| 36 | −69.513 | 8.22 | | | 17.03 |
| 37 | 81.309 | 4.18 | 1.48749 | 70.2 | 17.30 |
| 38 | −17.980 | 0.70 | 1.83481 | 42.7 | 17.22 |
| 39 | −132.696 | 0.24 | | | 17.65 |
| 40 | 16.926 | 3.18 | 1.58913 | 61.1 | 18.26 |
| 41 | 42.506 | 10.00 | | | 17.76 |
| 42 | 56.339 | 0.70 | 1.88300 | 40.8 | 14.89 |
| 43 | 12.573 | 0.37 | | | 14.20 |
| 44 | 13.469 | 4.36 | 1.49700 | 81.5 | 14.42 |
| 45 | −34.851 | 0.15 | | | 14.45 |
| 46 | 25.511 | 2.43 | 1.50137 | 56.4 | 14.11 |
| 47 | −175.683 | 5.00 | | | 13.71 |
| 48 | ∞ | 21.00 | 1.70154 | 41.2 | 30.00 |

-continued (Numerical Embodiment 3)

| 49 | ∞ | 6.75 | 1.51633 | 64.1 | 30.00 |
| 50 | ∞ | | | | 30.00 |
| Image plane | ∞ | | | | |

Aspherical surface data

First surface

K = 1.24879e+004　A 4 = 9.02225e−006　A 6 = −1.16605e−008
A 8 = 1.77122e−011　A10 = −2.78310e−014　A12 = 2.62952e−017

Tenth surface

K = 1.37597e+002　A 4 = 3.22128e−006　A 6 = −1.54134e−010
A 8 = −6.77015e−012　A10 = 1.95768e−014　A12 = −1.86270e−017

Various data
Zoom ratio 4.00

| Focal length | 4.00 | 8.00 | 12.00 | 14.00 | 16.00 |
|---|---|---|---|---|---|
| F-number | 2.00 | 2.00 | 2.00 | 2.00 | 2.00 |
| Angle of field | 36.87 | 20.56 | 14.04 | 12.09 | 10.62 |
| Image height | 3.00 | 3.00 | 3.00 | 3.00 | 3.00 |
| Total lens length | 225.37 | 225.37 | 225.37 | 225.37 | 225.37 |
| BF | 4.99 | 4.99 | 4.99 | 4.99 | 4.99 |
| d19 | 0.70 | 11.92 | 16.79 | 18.37 | 19.61 |
| d27 | 18.98 | 7.14 | 3.00 | 2.05 | 1.52 |
| d30 | 2.60 | 3.22 | 2.49 | 1.87 | 1.15 |
| d50 | 4.99 | 4.99 | 4.99 | 4.99 | 4.99 |
| Entrance pupil position | 23.48 | 26.96 | 29.54 | 30.61 | 31.55 |
| Exit pupil position | −934.25 | −934.25 | −934.25 | −934.25 | −934.25 |
| Front principal point position | 27.47 | 34.90 | 41.39 | 44.40 | 47.28 |
| Rear principal point position | 0.99 | −3.01 | −7.01 | −9.01 | −11.01 |

Zoom lens unit data

| Unit | First surface | Focal length | Lens structure length | Front principal point position | Rear principal point position |
|---|---|---|---|---|---|
| 1 | 1 | 14.10 | 111.09 | 30.64 | 24.47 |
| 2 | 20 | −14.10 | 7.89 | −0.23 | −6.52 |
| 3 | 28 | −26.70 | 2.33 | −0.01 | −1.31 |
| 4 | 31 | 27.28 | 76.80 | 26.46 | −59.09 |

Embodiment 4

Embodiment 4 of the present invention is described.

Figure 8:
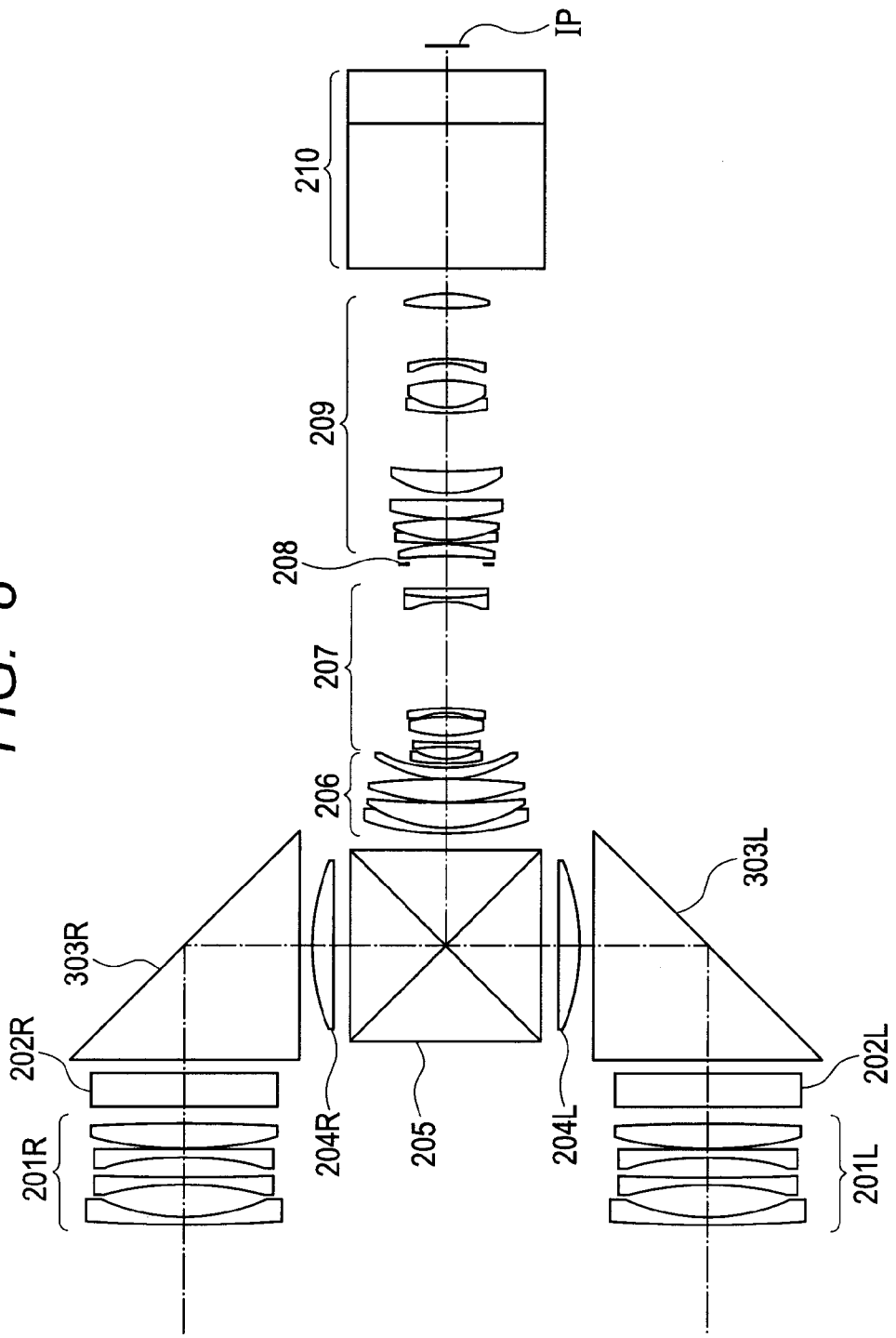
FIG. 8 is a lens cross-sectional view of optical system at a wide angle end and an infinite object distance according to Embodiment 4.

FIG. 8 is an optical cross-sectional view at a wide angle end in focus at an infinite object distance in a three-dimensional image pickup apparatus according to Embodiment 4 (Numerical Embodiment 4) of the present invention. A three-dimensional image pickup optical system of Embodiment 4 has basically the same structure as Embodiments 1 to 3, but is different in including prisms 303R and 303L instead of the mirrors 203R and 203L in the structures of Embodiments 1 to 3. In Embodiment 4, the prisms 303R and 303L deflect the optical paths of light beams for the left and right eyes. Other structures are the same as those in Embodiments 1 to 3, and hence descriptions thereof are omitted.

Figure 9A:
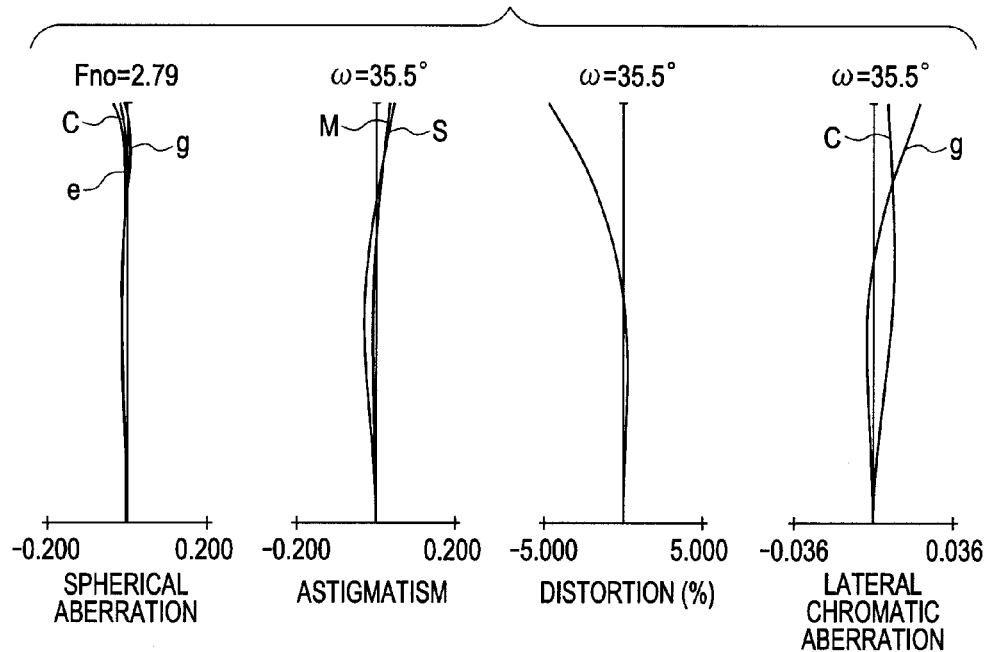
FIG. 9A is an aberration diagram at the wide angle end and an object distance of 3.0 m according to Embodiment 4.
Figure 9B:
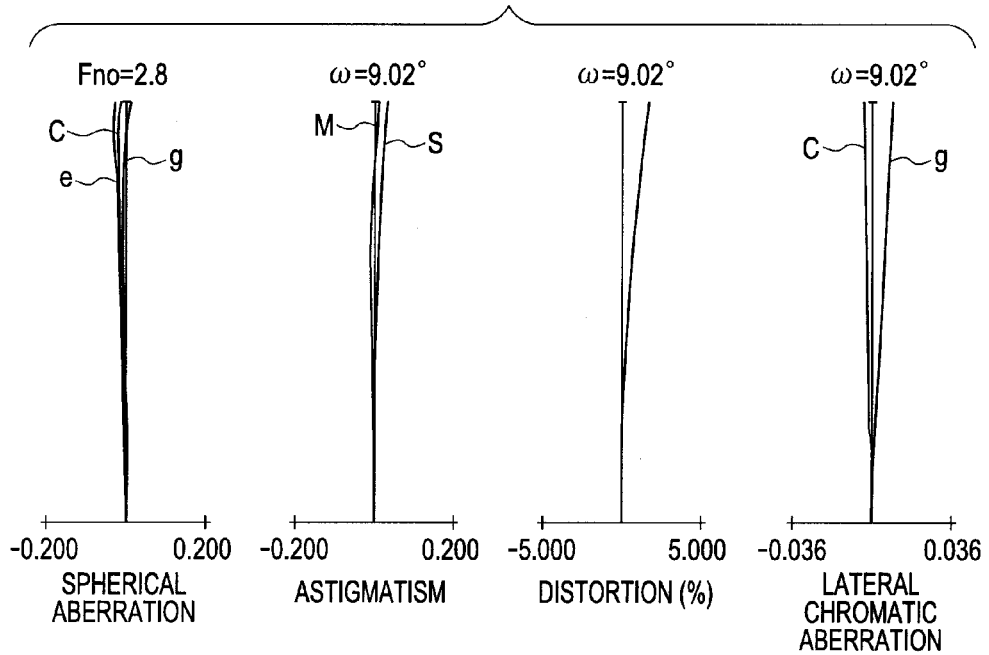
FIG. 9B is an aberration diagram at a telephoto end and an object distance of 3.0 m according to Embodiment 4.

FIG. 9A is a longitudinal aberration diagram at a wide angle end in focus at an object distance of 3.0 m according to Numerical Embodiment 4. FIG. 9B is a longitudinal aberration diagram at a telephoto end in focus at an object distance of 3.0 m according to Numerical Embodiment 4. The scales are 0.2 mm for spherical aberration, 0.2 mm for astigmatism, 5% for distortion, and 0.036 mm for lateral chromatic aberration.

Numerical Embodiment 4 corresponding to Embodiment 4 satisfies Conditional Expressions (1) to (3). In addition, Conditional Expressions (1a), (2a), and (3a) of more preferred value ranges are also satisfied. Thus, a half angle of field of 35.5° at the wide angle end, a magnification-varying ratio of 4.5, and an F-number of 2.8 at the telephoto end are achieved.

(Numerical Embodiment 4)
Surface data

| Surface number | r | d | nd | vd | Effective diameter |
|---|---|---|---|---|---|
| 1* | 5927.949 | 1.50 | 1.88300 | 40.8 | 36.13 |
| 2 | 38.469 | 6.57 | | | 32.51 |
| 3 | −56.910 | 1.20 | 1.88300 | 40.8 | 32.06 |
| 4 | 307.110 | 4.29 | | | 31.86 |
| 5 | −56.059 | 1.20 | 1.83481 | 42.7 | 31.85 |
| 6 | 2120.528 | 0.27 | | | 32.80 |
| 7 | 80.356 | 5.19 | 1.92286 | 18.9 | 33.83 |
| 8 | −216.404 | 3.00 | | | 33.94 |
| 9 | ∞ | 7.00 | 1.51633 | 64.1 | 33.70 |
| 10 | ∞ | 3.00 | | | 33.40 |
| 11 | ∞ | 45.00 | 1.51633 | 64.1 | 33.20 |
| 12 | ∞ | 3.00 | | | 31.25 |
| 13 | 48.500 | 4.02 | 1.60311 | 60.6 | 30.89 |
| 14* | −794.479 | 3.00 | | | 30.82 |
| 15 | ∞ | 38.00 | 1.51633 | 64.1 | 30.73 |
| 16 | ∞ | 3.00 | | | 29.99 |
| 17 | 55.718 | 1.20 | 2.00330 | 28.3 | 29.84 |
| 18 | 29.698 | 4.78 | 1.49700 | 81.5 | 28.98 |
| 19 | 171.814 | 0.15 | | | 28.95 |
| 20 | 42.597 | 4.40 | 1.59240 | 68.3 | 29.06 |
| 21 | −169.779 | 0.15 | | | 28.77 |
| 22 | 23.672 | 2.00 | 1.48749 | 70.2 | 26.43 |
| 23 | 28.615 | (Variable) | | | 25.68 |
| 24 | 27.052 | 0.70 | 2.00330 | 28.3 | 12.55 |
| 25 | 11.748 | 2.40 | | | 11.71 |
| 26 | −34.685 | 0.70 | 1.81600 | 46.6 | 11.71 |
| 27 | 42.425 | 1.61 | | | 11.97 |
| 28 | 23.272 | 3.87 | 1.80518 | 25.4 | 13.14 |
| 29 | −30.290 | 0.43 | | | 13.18 |
| 30 | −20.940 | 0.70 | 1.77250 | 49.6 | 13.15 |
| 31 | −367.241 | (Variable) | | | 13.32 |
| 32 | −20.241 | 0.70 | 1.72916 | 54.7 | 13.60 |
| 33 | 58.301 | 2.00 | 1.80809 | 22.8 | 14.50 |
| 34 | −234.743 | (Variable) | | | 15.01 |
| 35 (Stop) | ∞ | 1.80 | | | 15.74 |
| 36 | −184.071 | 2.23 | 1.60311 | 60.6 | 16.72 |
| 37 | −40.258 | 0.20 | | | 17.32 |
| 38 | 79.501 | 0.70 | 1.83481 | 42.7 | 17.96 |
| 39 | 23.959 | 4.05 | 1.48749 | 70.2 | 18.16 |
| 40 | −66.736 | 0.20 | | | 18.68 |
| 41 | 40.831 | 4.08 | 1.50137 | 56.4 | 19.40 |
| 42 | 1564.154 | 1.00 | | | 19.58 |
| 43 | 18.446 | 4.30 | 1.60311 | 60.6 | 19.98 |
| 44 | 44.247 | 12.00 | | | 19.00 |
| 45 | 112.869 | 0.70 | 1.88300 | 40.8 | 14.67 |
| 46 | 12.256 | 0.00 | | | 13.97 |
| 47 | 12.291 | 5.85 | 1.49700 | 81.5 | 13.96 |
| 48 | −21.674 | 3.43 | | | 14.00 |
| 49 | −15.151 | 0.70 | 1.77250 | 49.6 | 12.98 |
| 50 | −25.000 | 10.00 | | | 13.28 |
| 51 | 54.733 | 2.94 | 1.50137 | 56.4 | 15.72 |
| 52 | −30.056 | 5.00 | | | 15.77 |
| 53 | ∞ | 29.00 | 1.60342 | 38.0 | 36.00 |
| 54 | ∞ | 11.00 | 1.51633 | 64.2 | 36.00 |
| 55 | ∞ | | | | 36.00 |
| Image plane | ∞ | | | | |

Aspherical surface data

First surface

K = 9.94137e+004　A 4 = 8.66886e−006　A 6 = −1.88406e−008
A 8 = 3.13520e−011　A10 = −1.49429e−014　A12 = −2.46060e−017

Fourteenth surface

K = 9.76271e+002　A 4 = 3.00514e−006　A 6 = 1.30262e−010
A 8 = −2.21431e−012　A10 = 7.30182e−015　A12 = −6.94233e−018

-continued (Numerical Embodiment 4)

Various data
Zoom ratio 4.50

| | | | | | |
|---|---|---|---|---|---|
| Focal length | 5.60 | 11.20 | 16.80 | 22.40 | 25.20 |
| F-number | 2.79 | 2.79 | 2.79 | 2.80 | 2.80 |
| Angle of field | 35.54 | 19.65 | 13.39 | 10.12 | 9.02 |
| Image height | 4.00 | 4.00 | 4.00 | 4.00 | 4.00 |
| Total lens length | 286.37 | 286.37 | 286.37 | 286.37 | 286.37 |
| BF | 5.00 | 5.00 | 5.00 | 5.00 | 5.00 |
| d23 | 1.18 | 13.63 | 19.01 | 22.08 | 23.11 |
| d31 | 21.58 | 8.53 | 4.25 | 2.97 | 2.91 |
| d34 | 4.40 | 5.00 | 3.90 | 2.10 | 1.09 |
| d55 | 5.00 | 5.00 | 5.00 | 5.00 | 5.00 |
| Entrance pupil position | 25.46 | 29.12 | 31.91 | 34.14 | 35.08 |
| Exit pupil position | −440.85 | −440.85 | −440.85 | −440.85 | −440.85 |
| Front principal point position | 30.98 | 40.04 | 48.07 | 55.41 | 58.86 |
| Rear principal point position | −0.60 | −6.20 | −11.80 | −17.40 | −20.20 |

Zoom lens unit data

| Unit | First surface | Focal length | Lens structure length | Front principal point position | Rear principal point position |
|---|---|---|---|---|---|
| 1 | 1 | 15.00 | 141.92 | 33.30 | 29.29 |
| 2 | 24 | −16.10 | 10.41 | 0.81 | −6.81 |
| 3 | 32 | −32.20 | 2.70 | −0.19 | −1.70 |
| 4 | 35 | 37.06 | 99.18 | 33.50 | −92.48 |

Embodiment 5

Embodiment 5 of the present invention is described.

Figure 10:
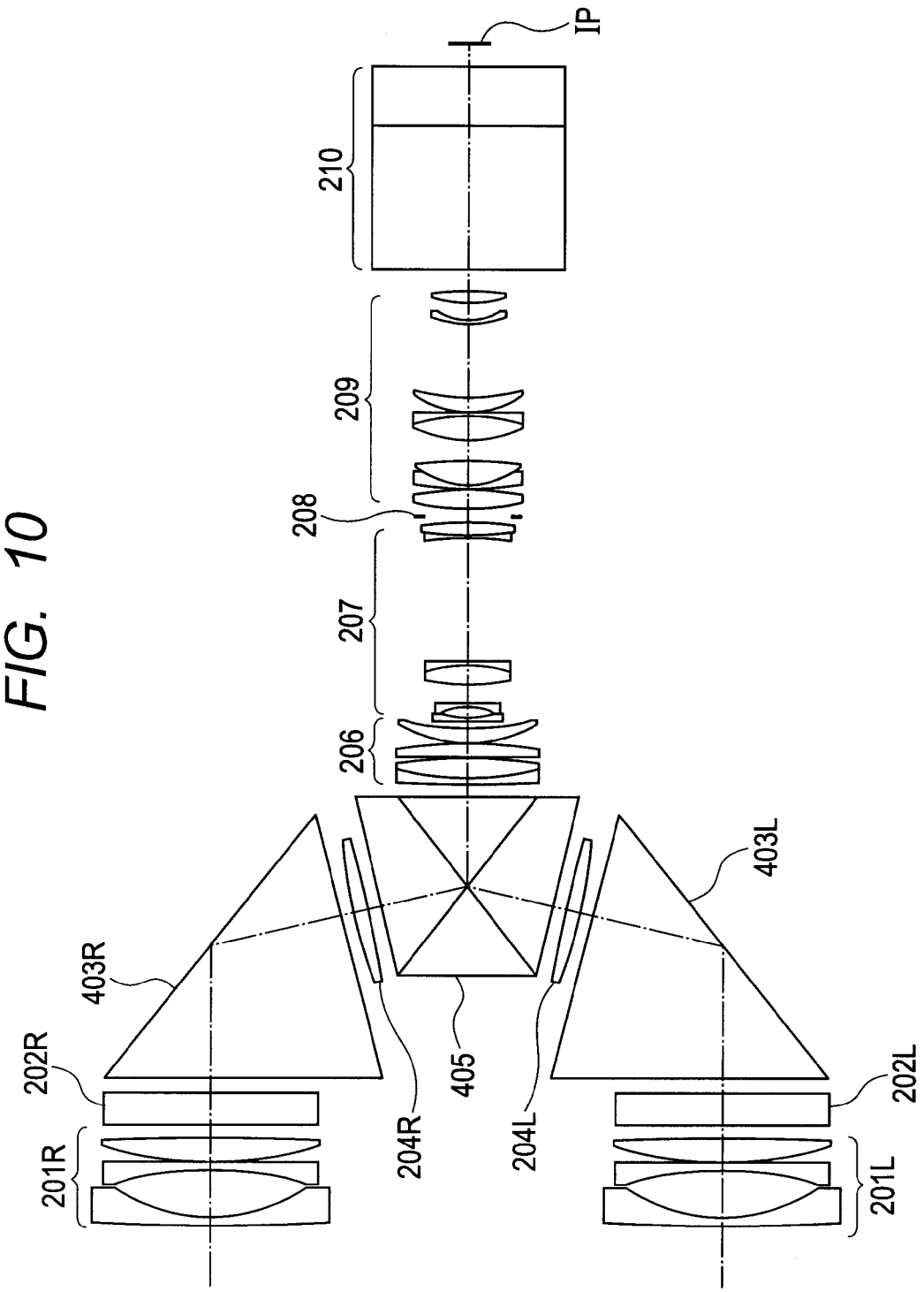
FIG. 10 is a lens cross-sectional view of optical system at a wide angle end and an infinite object distance according to Embodiment 5.

FIG. 10 is an optical cross-sectional view at a wide angle end in focus at an infinite object distance in a three-dimensional image pickup apparatus according to Embodiment 5 (Numerical Embodiment 5) of the present invention. A three-dimensional image pickup optical system of Embodiment 5 has basically the same structure as Embodiment 4. However, Embodiment 5 is different from Embodiment 4 in that an optical axis incident angle to the polarization beam splitter 205 and the prisms 303R and 303L is 45° in Embodiment 4, while an optical axis incident angle to a polarization beam splitter 405 and prisms 403R and 403L is 52° in Embodiment 5, in order to shorten a base line length to the left and right eyes. In Embodiment 5, the prisms 403R and 403L and the polarization beam splitter 405 are disposed in place of the prisms 303R and 303L and the polarization beam splitter 205 in Embodiment 4, and an optical axis incident angle of 52° is realized. Other structures are the same as those in Embodiments 1 to 4, and descriptions thereof are omitted.

Figure 11A:
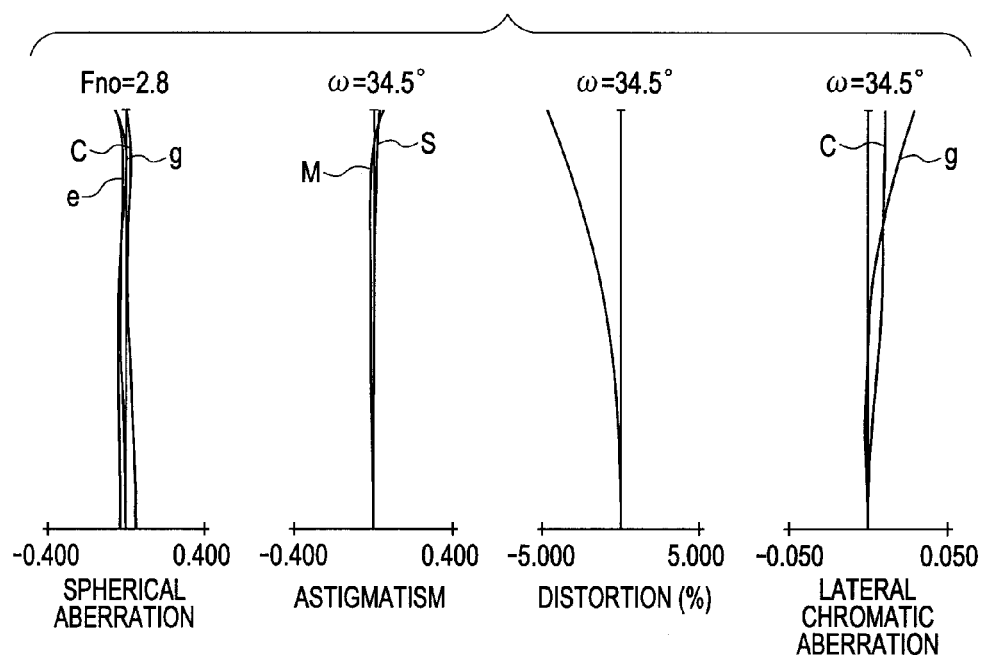
FIG. 11A is an aberration diagram at the wide angle end and an object distance of 3.0 m according to Embodiment 5.
Figure 11B:
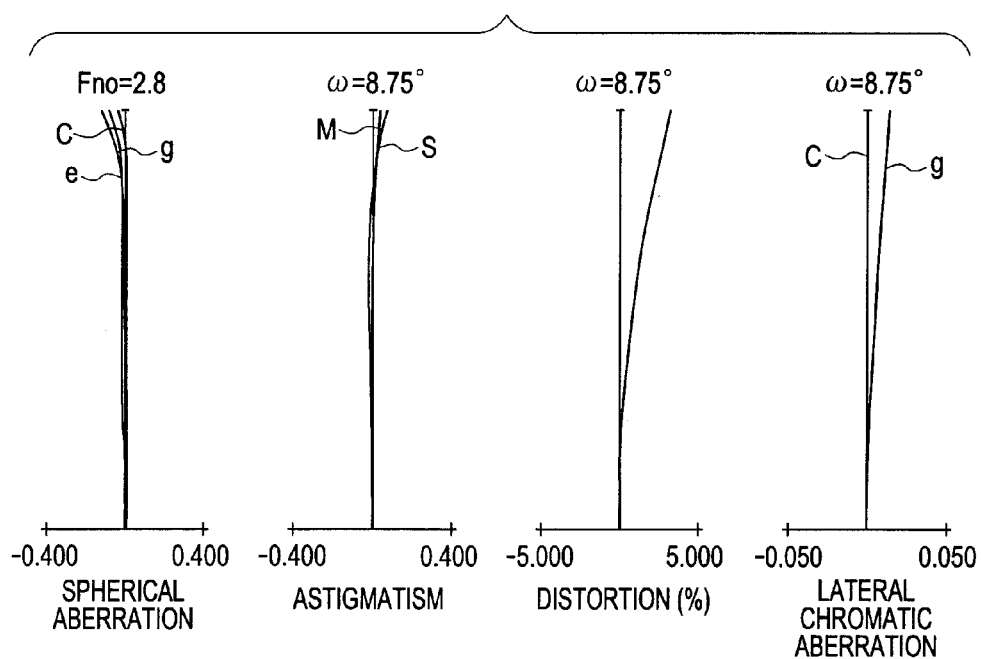
FIG. 11B is an aberration diagram at a telephoto end and an object distance of 3.0 m according to Embodiment 5.

FIG. 11A is a longitudinal aberration diagram at the wide angle end in focus at an object distance of 3.0 m according to Numerical Embodiment 5. FIG. 11B is a longitudinal aberration diagram at a telephoto end in focus at an object distance of 3.0 m according to Numerical Embodiment 5. The scales are 0.4 mm for spherical aberration, 0.4 mm for astigmatism, 5% for distortion, and 0.05 mm for lateral chromatic aberration.

Numerical Embodiment 5 corresponding to Embodiment 5 satisfies Conditional Expressions (1) to (3). In addition, Conditional Expressions (1a), (2a), and (3a) of more preferred value ranges are also satisfied. Thus, a half angle of field of 34.5° at the wide angle end, a magnification-varying ratio of 4, and an F-number of 2.8 at the telephoto end are achieved.

(Numerical Embodiment 5)

Surface data

| Surface number | r | d | nd | vd | Effective diameter |
|---|---|---|---|---|---|
| 1* | 11636.568 | 1.80 | 1.88300 | 40.8 | 49.27 |
| 2 | 38.273 | 10.91 | | | 43.38 |
| 3 | −65.755 | 1.50 | 1.83481 | 42.7 | 43.27 |
| 4 | −1884.793 | 0.15 | | | 44.25 |
| 5 | 82.355 | 5.53 | 1.92286 | 18.9 | 45.43 |
| 6 | −477.686 | 3.00 | | | 45.24 |
| 7 | ∞ | 7.00 | 1.51633 | 64.1 | 44.19 |
| 8 | ∞ | 3.00 | | | 42.82 |
| 9 | ∞ | 60.00 | 1.83481 | 42.7 | 41.92 |
| 10 | ∞ | 3.00 | | | 32.26 |
| 11 | 132.422 | 3.32 | 1.60311 | 60.6 | 31.09 |
| 12* | −531.400 | 3.00 | | | 30.48 |
| 13 | ∞ | 40.00 | 1.83481 | 42.7 | 28.94 |
| 14 | ∞ | 3.00 | | | 29.11 |
| 15 | 343.593 | 1.20 | 2.00330 | 28.3 | 29.39 |
| 16 | 57.266 | 4.73 | 1.49700 | 81.5 | 29.39 |
| 17 | −94.441 | 0.15 | | | 29.70 |
| 18 | 320.636 | 3.07 | 1.59240 | 68.3 | 29.89 |
| 19 | −84.873 | 0.15 | | | 29.95 |
| 20 | 31.496 | 3.43 | 1.69680 | 55.5 | 29.18 |
| 21 | 70.898 | (Variable) | | | 28.52 |
| 22 | 78.869 | 0.70 | 2.00330 | 28.3 | 13.88 |
| 23 | 17.703 | 2.34 | | | 13.26 |
| 24 | −28.524 | 0.70 | 1.81600 | 46.6 | 13.28 |
| 25 | 95.138 | 4.64 | | | 13.70 |
| 26 | 53.288 | 4.33 | 1.80518 | 25.4 | 16.71 |
| 27 | −25.852 | 0.27 | | | 17.08 |
| 28 | −23.431 | 0.70 | 1.77250 | 49.6 | 17.05 |
| 29 | −238.501 | (Variable) | | | 17.46 |
| 30 | −35.516 | 0.70 | 1.72916 | 54.7 | 17.91 |
| 31 | 225.645 | 2.50 | 1.80809 | 22.8 | 18.69 |
| 32 | −140.549 | (Variable) | | | 19.40 |
| 33 (Stop) | ∞ | 1.70 | | | 20.41 |
| 34 | 52.499 | 4.84 | 1.58913 | 61.1 | 21.98 |
| 35 | −43.136 | 0.15 | | | 22.34 |
| 36 | 99.064 | 0.70 | 1.83481 | 42.7 | 22.23 |
| 37 | 19.598 | 5.42 | 1.50137 | 56.4 | 21.78 |
| 38 | −112.286 | 4.87 | | | 22.00 |
| 39 | 32.056 | 5.35 | 1.51633 | 64.1 | 22.83 |
| 40 | −38.827 | 0.70 | 1.88300 | 40.8 | 22.54 |
| 41 | 194.530 | 0.40 | | | 22.47 |
| 42 | 21.854 | 3.43 | 1.58913 | 61.1 | 22.63 |
| 43 | 52.624 | 16.96 | | | 22.05 |
| 44 | 21.154 | 0.70 | 1.90366 | 31.3 | 15.38 |
| 45 | 13.946 | 4.34 | | | 14.77 |
| 46 | 29.975 | 2.70 | 1.50127 | 56.5 | 15.62 |
| 47 | −79.348 | 5.00 | | | 15.61 |
| 48 | ∞ | 33.00 | 1.60859 | 46.4 | 40.00 |
| 49 | ∞ | 13.20 | 1.51680 | 64.2 | 40.00 |
| 50 | ∞ | | | | 40.00 |
| Image plane | ∞ | | | | |

Aspherical surface data

First surface

K = 2.07727e+005   A4 = 2.06905e−006   A6 = −2.27067e−009
A8 = 2.27155e−012   A10 = −1.30652e−015   A12 = 8.21057e−020

Twelfth surface

K = 3.51086e+002   A4 = 6.87077e−007   A6 = −7.51880e−010
A8 = 4.94899e−012   A10 = −2.21454e−014   A12 = 4.20792e−017

Various data
Zoom ratio 4.00

| | | | | | |
|---|---|---|---|---|---|
| Focal length | 8.00 | 16.00 | 24.00 | 28.00 | 32.00 |
| F-number | 2.80 | 2.79 | 2.80 | 2.80 | 2.80 |
| Angle of field | 34.51 | 18.97 | 12.91 | 11.11 | 9.75 |
| Image height | 5.50 | 5.50 | 5.50 | 5.50 | 5.50 |
| Total lens length | 314.08 | 314.08 | 314.08 | 314.08 | 314.08 |
| BF | 5.01 | 5.01 | 5.01 | 5.01 | 5.01 |
| d21 | 1.44 | 16.69 | 23.11 | 25.16 | 26.76 |
| d29 | 27.96 | 9.12 | 3.47 | 2.62 | 2.49 |

-continued (Numerical Embodiment 5)

| | | | | | |
|---|---|---|---|---|---|
| d32 | 1.40 | 5.00 | 4.22 | 3.03 | 1.55 |
| d50 | 5.01 | 5.01 | 5.01 | 5.01 | 5.01 |
| Entrance pupil position | 35.34 | 41.31 | 45.92 | 47.90 | 49.69 |
| Exit pupil position | −104.28 | −104.28 | −104.28 | −104.28 | −104.28 |
| Front principal point position | 42.76 | 54.96 | 64.65 | 68.72 | 72.32 |
| Rear principal point position | −2.99 | −10.99 | −18.99 | −22.99 | −26.99 |

Zoom lens unit data

| Unit | First surface | Focal length | Lens structure length | Front principal point position | Rear principal point position |
|---|---|---|---|---|---|
| 1 | 1 | 20.60 | 157.94 | 44.93 | 31.19 |
| 2 | 22 | −16.80 | 13.69 | −0.25 | −11.78 |
| 3 | 30 | −70.30 | 3.20 | −0.74 | −2.54 |
| 4 | 33 | 31.72 | 103.45 | 15.46 | −74.11 |

TABLE 1

Conditional Expression correspondence values in Numerical Embodiments 1 to 5

| Number | Conditional Expression | Numerical Embodiment 1 | Numerical Embodiment 2 | Numerical Embodiment 3 | Numerical Embodiment 4 | Numerical Embodiment 5 |
|---|---|---|---|---|---|---|
| (1) | f1f/fw | −6.23 | −6.15 | −6.15 | −2.73 | −5.88 |
| (2) | f1b/ft | 2.52 | 1.50 | 2.92 | 2.04 | 1.45 |
| (3) | βvw × βcw × βrw | 0.28 | 0.28 | 0.28 | 0.37 | 0.39 |

The present invention can be applicable to a three-dimensional image pickup apparatus which includes an image pickup element and the three-dimensional image pickup optical system which guides light from an object to the image pickup element (which forms an image of the object on the image pickup element).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-283492, filed Dec. 20, 2010, which is hereby incorporated by reference herein in its entirety.

What is claimed is:

1. A three-dimensional image pickup optical system for forming two different images having a parallax for left and right eyes alternately in time sequence on a single image pickup element, the three-dimensional image pickup optical system comprising, in order from an object side:
a front optical system including a pair of 1f-lens units each having a negative refractive power, a pair of optical path deflecting units, and an optical path combining unit for combining two optical paths on the same optical axis; and
a rear optical system including a 1b-lens unit having a positive refractive power which does not move for magnification-varying, a lens unit which moves for the magnification-varying, and a stop,
wherein the front optical system includes a pair of light quantity control units, which are disposed in the optical paths for the left and right eyes on the object side of the optical path combining unit, for switching left and right subject images alternately in a time sharing manner, and
wherein the following conditions are satisfied:

$-10.0 < f1f/fw < -1.5$; and $0.9 < f1b/ft < 5.0$, where f1f denotes a focal length of the 1f-lens unit, f1b denotes a focal length of the 1b-lens unit, fw denotes a focal length at a wide angle end of the three-dimensional image pickup optical system, and ft denotes a focal length at a telephoto end of the three-dimensional image pickup optical system.

2. A three-dimensional image pickup optical system according to claim 1, wherein the front optical system further includes a 2f-lens unit having a positive refractive power between each of the pair of optical path deflecting units and the optical path combining unit.

3. A three-dimensional image pickup optical system according to claim 1, wherein the rear optical system includes the 1b-lens unit having the positive refractive power which does not move for the magnification-varying, a 2b-lens unit having a negative refractive power which moves for the magnification-varying, a 3b-lens unit for image plane correction, the stop, and a 4b-lens unit having a positive refractive power which does not move for the magnification-varying.

4. A three-dimensional image pickup optical system according to claim 3, wherein, in the rear optical system, the following conditional expression is satisfied:

$0.15 < βvw × βcw × βrw < 0.60$, where βvw denotes an imaging magnification of the 2b-lens unit at the wide angle end and an infinite object distance, βcw denotes an imaging magnification of the 3b-lens unit at the wide angle end and the infinite object distance, and βrw denotes an imaging magnification of the 4b-lens unit at the wide angle end and the infinite object distance.

5. A three-dimensional image pickup apparatus, comprising:
an image pickup element; and
the three-dimensional image pickup optical system according to claim 1 for guiding light from an object to the image pickup element.

* * * * *